(12) United States Patent
Eaton et al.

(10) Patent No.: US 7,407,600 B2
(45) Date of Patent: Aug. 5, 2008

(54) HEAT-TRANSFER SYSTEMS

(75) Inventors: Edward Eaton, Phoenix, AZ (US); Scot D. Kudcey, South Easton, MA (US)

(73) Assignee: Dupont Tale + Lyle Bio Products Company, LLC, Wilmington, DE (US)

( * ) Notice: Subject to any disclaimer, the term of this patent is extended or adjusted under 35 U.S.C. 154(b) by 578 days.

(21) Appl. No.: 10/886,298

(22) Filed: Jul. 6, 2004

(65) Prior Publication Data

US 2005/0013753 A1 Jan. 20, 2005

Related U.S. Application Data

(60) Provisional application No. 60/485,441, filed on Jul. 7, 2003.

(51) Int. Cl.
*C09K 5/00* (2006.01)
(52) U.S. Cl. .............................. 252/73; 252/67; 252/71
(58) Field of Classification Search .................. 252/67, 252/71, 73; 422/198, 200
See application file for complete search history.

(56) References Cited

U.S. PATENT DOCUMENTS

| | | | |
|---|---|---|---|
| 2,517,734 A | 8/1950 | Taylor, Jr. | |
| 5,167,826 A | 12/1992 | Eaton | |
| 5,194,159 A | 3/1993 | George et al. | |
| 5,519,189 A | 5/1996 | Gibisch | |
| 5,922,198 A * | 7/1999 | Kelly et al. | .................. 210/241 |

FOREIGN PATENT DOCUMENTS

| | | | |
|---|---|---|---|
| WO | WO 0017951 A1 * | 3/2000 | |
| WO | WO 02073727 A1 * | 9/2002 | |

OTHER PUBLICATIONS

E.R. Eaton et al., A Chemical Base for Engine Coolant/Antifreeze with Improved Thermal Stability Properties, SAE Technical Paper Series, No. 2001-01-1182, Mar. 2001.*

"A Chemical Base for Engine Coolant/Antifreeze with Improved Thermal Stability Properties" by Edward Eaton, W.H. Boon, and Chris J. Smith, document No. 2001-01-1182, published by the Society pf Automotive Engineers, Inc, 2001.

* cited by examiner

*Primary Examiner*—Glenn Caldarola
*Assistant Examiner*—Randy Boyer
(74) *Attorney, Agent, or Firm*—McCarter & English, LLP

(57) ABSTRACT

An improved system for transferring heat, utilizing diols, specifically 1,3-propanediol (PDO). The system reduces the energy consumption, maintenance costs, corrosion, toxicity, and the risk of fire associated with such heat-dependent processes. Unlike traditional hydrocarbon heating fluids, diols do not require draining and replacement if a purifier is installed in the system. Business methods are also disclosed.

13 Claims, 10 Drawing Sheets

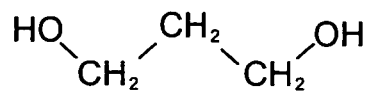
FIG. 2
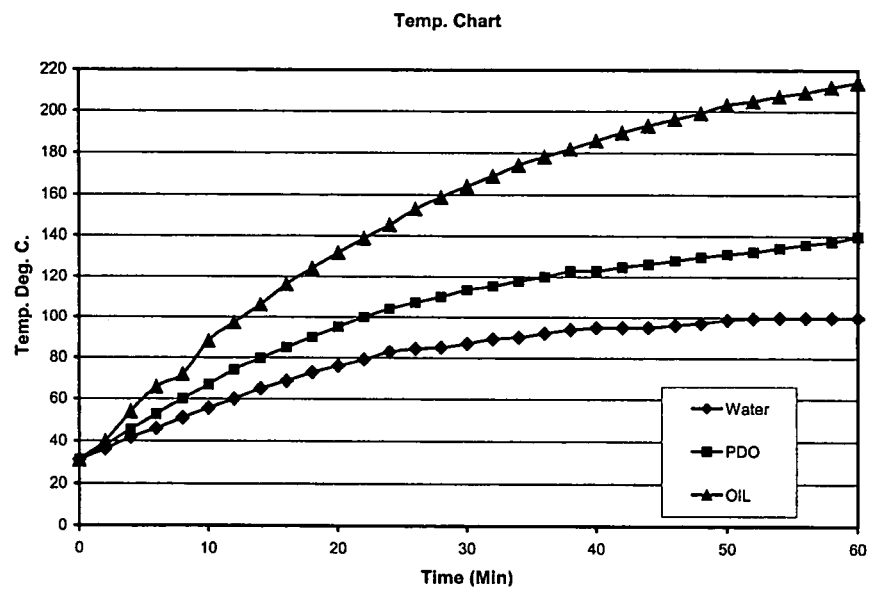
FIG. 3
Liquid Thermal Conductivity (Btu/hr-ft-F)
PDO v. Mobiltherm 603
| TEMP. | PDO | M-603 |
|---|---|---|
| 200F/93.33C | 0.127 | 0.076 |
| 250F/121.1C | 0.126 | 0.075 |
| 300F/148.9C | 0.124 | 0.073 |
| 350F/176.7C | 0.122 | 0.072 |
| 400F/204.4C | 0.119 | 0.070 |
FIG. 4

HEAT-TRANSFER SYSTEMS

CROSS-REFERENCE TO RELATED APPLICATION

The present application claims priority from and is related to prior provisional application Ser. No. 60/485,441, filed Jul. 7, 2003, entitled "HEAT TRANSFER SYSTEM", the contents of which are incorporated herein by this reference and are not admitted to be prior art with respect to the present invention by the mention in this cross-reference section.

BACKGROUND

This invention relates to heat-transfer systems. More particularly, it relates to providing a system for improved heat transfer in processes requiring the input of thermal energy.

Typically, hydrocarbon fluids have been used for transferring heat in high-temperature-dependent processes. Unfortunately, such hydrocarbon fluids are typically not biodegradable and are deemed environmentally hazardous. Also, among other problems, they have relatively low thermal conductivity and thus may demand excessive amounts of energy. In addition, they are highly flammable and not water-miscible so that traditional water sprinkler systems fail to suppress fires involving such hydrocarbon fluids.

Industrial entities utilizing endothermic processes consume large amounts of energy in order to supply heat during the endothermic processes. Hydrocarbon heat-transfer fluids used to transfer such heat typically break down over time and therefore are continuously filtered as well as being completely replaced every, say, 7 to 8 years. Furthermore, particulate waste byproduct is created, resulting in further cleaning and toxic-waste type disposal costs. Additionally, as hydrocarbon heat-transfer fluids are extremely flammable, fires involving hydrocarbon heat-transfer fluids have resulted in tremendous property damage, economic loss, injuries and death.

With respect to such flammability, ignition of these hydrocarbon heat-transfer fluids has been established as a primary cause in many industrial fires. For example, in 1989, a leak at a plastics manufacturing plant in Pasadena, Tex., caused a fire that killed 22 and injured 80. Similarly, in 1991, the oil from a conveyor belt at a food products plant in Hamlet, N.C., caused a fire that killed 24 and injured 56. To date, the efforts that have been made worldwide to minimize the risk of fire involving machines using hydrocarbon heat-transfer fluids in thermally-dependent processes have not solved this problem.

Therefore, a need exists for a system that dramatically reduces the risk of industrial fires. Furthermore, a need exists for a system offering reduced energy consumption and maintenance costs, as well as lower toxicity and longer useful life.

OBJECTS AND FEATURES OF THE INVENTION

A primary object and feature of the present invention is to overcome the above-mentioned problems and fulfill the above-mentioned needs.

A further primary object and feature of the present invention is to provide an improved system for providing heat to thermally dependent processes. It is a further object and feature of the present invention to provide such a system capable of reduced energy consumption.

It is a further object and feature of the present invention to provide such a system capable of dramatically reducing the fire-damage risks associated with fires involving heat-transfer fluids.

It is a further object and feature of the present invention to provide such a system capable of a significantly longer fluid life.

It is a further object and feature of the present invention to provide such a system reducing the amount of maintenance required in endothermic industrial processes. It is a further object and feature of the present invention to provide such a system capable of reduced corrosion. It is a further object and feature of the present invention to provide such a system capable of reduced toxicity.

It is a further object and feature of the present invention to provide a heat-transfer fluid for endothermic industrial processes that can be extinguished with water in case of fire.

It is a further object and feature of this invention to provide a heat-transfer fluid that is low toxicity, minimally corrosive, low-maintenance, durable, and water extinguishable.

It is a further object and feature of this invention to provide a non-hydrocarbon heat-transfer fluid. It is a further object and feature of this invention to provide a heat-transfer fluid and method for endothermic industrial processes using 1,3-propanediol.

It is a further object and feature of this invention to provide methods for upgrading or installing a heat-transfer system using heat-transfer fluids in accordance with this invention.

A further primary object and feature of the present invention is to provide such a system that is efficient, inexpensive and safe. Other objects and features of this invention will become apparent with reference to the following descriptions.

SUMMARY OF THE INVENTION

In accordance with a preferred embodiment hereof, this invention provides a heat transfer system comprising: heat-transfer fluid means for transferring heat, without substantial chemical breakdown, at temperatures of about 100 degrees Celsius to about 225 degrees Celsius; industrial processor means for endothermic industrial processing; heater means for controllably transferring heat to such heat-transfer fluid means; heat transfer means for controllably transferring heat from such heat-transfer fluid means to such industrial process means; circulating means for circulating such heat-transfer fluid means among such heater means and such heat transfer means; wherein such heat-transfer fluid means comprises essentially 1,3-propanediol.

In accordance with another preferred embodiment hereof, this invention provides a heat transfer system comprising: at least one heat-transfer fluid adapted to transfer heat, without substantial chemical breakdown, at temperatures of about 100 degrees Celsius to about 225 degrees Celsius; at least one industrial processor structured and arranged to provide endothermic industrial processing; at least one heater structured and arranged to controllably transfer heat to such at least one heat-transfer fluid; at least one heat transfer element structured and arranged to controllably transfer heat from such at least one heat-transfer fluid to such at least one industrial processor; at least one circulator structured and arranged to circulate such at least one heat-transfer fluid among such at least one heater and such at least one heat transfer element; wherein such at least one heat-transfer fluid comprises essentially 1,3-propanediol.

Moreover, it provides such a heat transfer system, wherein such at least one circulator comprises at least one ion exchange purifier structured and arranged to assist ion exchange purification of such at least one heat-transfer fluid. Additionally, it provides such a heat transfer system, wherein such at least one circulator comprises at least one membrane filter structured and arranged to assist membrane filtration of such at least one heat-transfer fluid.

Also, it provides such a heat transfer system, wherein such at least one heat-transfer fluid comprises at least one heat-transfer fluid adapted to transfer heat, without substantial chemical breakdown, at temperatures of about 125 degrees Celsius to about 215 degrees Celsius. In addition, it provides such a heat transfer system, wherein such at least one heat-transfer fluid comprises at least one heat-transfer fluid adapted to transfer heat, without substantial chemical breakdown, at temperatures of about 150 degrees Celsius to about 200 degrees Celsius degrees Celsius.

In accordance with another preferred embodiment hereof, this invention provides a heat transfer system comprising: at least one heat-transfer fluid adapted to transfer heat, without substantial chemical breakdown, at temperatures of about 100 degrees Celsius to about 225 degrees Celsius; at least one industrial processor structured and arranged to provide endothermic industrial processing; at least one heater structured and arranged to controllably transfer heat to such at least one heat-transfer fluid; at least one heat transfer element structured and arranged to controllably transfer heat from such at least one heat-transfer fluid to such at least one industrial processor; at least one circulator structured and arranged to circulate such at least one heat-transfer fluid among such at least one heater and such at least one heat transfer element; wherein such at least one heat-transfer fluid comprises no substantial fraction of hydrocarbons.

And, it provides such a heat transfer system, wherein such at least one heat-transfer fluid comprises 1,3-propanediol. Further, it provides such a heat transfer system, wherein such at least one heat-transfer fluid comprises at least one water-miscible fluid adapted to permit essentially full solubility in water of such at least one heat-transfer fluid. Even further, it provides such a heat transfer system, wherein such at least one heat-transfer fluid comprises essentially at least one diol. Moreover, it provides such a heat transfer system, wherein such at least one heat-transfer fluid comprises at least one substance having thermal conductivity of at least 0.09 Btu/hr-ft-F. Additionally, it provides such a heat transfer system, wherein such at least one circulator comprises at least one ion exchange purifier structured and arranged to assist ion exchange purification of such at least one heat-transfer fluid. Also, it provides such a heat transfer system, wherein such at least one circulator comprises at least one membrane filter structured and arranged to assist membrane filtration of such at least one heat-transfer fluid.

In addition, it provides such a heat transfer system, wherein such at least one heat-transfer fluid comprises at least one heat-transfer fluid adapted to transfer heat, without substantial chemical breakdown, at temperatures of about 125 degrees Celsius to about 215 degrees Celsius. And, it provides such a heat transfer system, wherein such at least one heat-transfer fluid comprises at least one heat-transfer fluid adapted to transfer heat, without substantial chemical breakdown, at temperatures of about 150 degrees Celsius to about 200 degrees Celsius degrees Celsius.

In accordance with another preferred embodiment hereof, this invention provides a heat transfer system comprising: at least one heat-transfer fluid adapted to transfer heat, without substantial chemical breakdown, at temperatures of about 100 degrees Celsius to about 225 degrees Celsius; at least one industrial processor structured and arranged to provide endothermic industrial processing; at least one heater structured and arranged to controllably transfer heat to such at least one heat-transfer fluid; at least one heat transfer element structured and arranged to controllably transfer heat from such at least one heat-transfer fluid to such at least one industrial processor; at least one circulator structured and arranged to circulate such at least one heat-transfer fluid among such at least one heater and such at least one heat transfer element; wherein such at least one heat-transfer fluid comprises at least one water-miscible fluid adapted to permit essentially full solubility in water of such at least one heat-transfer fluid.

Further, it provides such a heat transfer system, wherein such at least one heat-transfer fluid comprises at least one substance having thermal conductivity of at least 0.09 Btu/hr-ft-F. Even further, it provides such a heat transfer system, wherein such at least one circulator comprises at least one ion exchange purifier structured and arranged to assist ion exchange purification of such at least one heat-transfer fluid. Moreover, it provides such a heat transfer system, wherein such at least one circulator comprises at least one membrane filter structured and arranged to assist membrane filtration of such at least one heat-transfer fluid.

Additionally, it provides such a heat transfer system, wherein such at least one heat-transfer fluid comprises at least one heat-transfer fluid adapted to transfer heat, without substantial chemical breakdown, at temperatures of about 125 degrees Celsius to about 215 degrees Celsius. Also, it provides such a heat transfer system, wherein such at least one heat-transfer fluid comprises at least one heat-transfer fluid adapted to transfer heat, without substantial chemical breakdown, at temperatures of about 150 degrees Celsius to about 200 degrees Celsius degrees Celsius.

In accordance with another preferred embodiment hereof, this invention provides a heat transfer system comprising: at least one heat-transfer fluid adapted to transfer heat, without substantial chemical breakdown, at temperatures of about 100 degrees Celsius to about 225 degrees Celsius; at least one industrial processor structured and arranged to provide endothermic industrial processing; at least one heater structured and arranged to controllably transfer heat to such at least one heat-transfer fluid; at least one heat transfer element structured and arranged to controllably transfer heat from such at least one heat-transfer fluid to such at least one industrial processor; at least one circulator structured and arranged to circulate such at least one heat-transfer fluid among such at least one heater and such at least one heat transfer element; wherein such at least one heat-transfer fluid comprises essentially at least one diol.

In addition, it provides such a heat transfer system, wherein such at least one heat-transfer fluid comprises at least one substance having thermal conductivity of at least 0.09 Btu/hr-ft-F. And, it provides such a heat transfer system, wherein such at least one circulator comprises at least one ion exchange purifier structured and arranged to assist ion exchange purification of such at least one heat-transfer fluid. Further, it provides such a heat transfer system, wherein such at least one circulator comprises at least one membrane filter structured and arranged to assist membrane filtration of such at least one heat-transfer fluid.

Even further, it provides such a heat transfer system, wherein such at least one heat-transfer fluid comprises at least one heat-transfer fluid adapted to transfer heat, without substantial chemical breakdown, at temperatures of about 125 degrees Celsius to about 215 degrees Celsius. Moreover, it provides such a heat transfer system, wherein such at least one heat-transfer fluid comprises at least one heat-transfer fluid adapted to transfer heat, without substantial chemical breakdown, at temperatures of about 150 degrees Celsius to about 200 degrees Celsius degrees Celsius.

In accordance with another preferred embodiment hereof, this invention provides a heat transfer system comprising: at least one heat-transfer fluid adapted to transfer heat, without substantial chemical breakdown, at temperatures of about 100 degrees Celsius to about 225 degrees Celsius; at least one industrial processor structured and arranged to provide endothermic industrial processing; at least one heater structured and arranged to controllably transfer heat to such at least one heat-transfer fluid; at least one heat transfer element structured and arranged to controllably transfer heat from such at least one heat-transfer fluid to such at least one industrial processor; at least one circulator structured and arranged to circulate such at least one heat-transfer fluid among such at least one heater and such at least one heat transfer element; wherein such at least one heat-transfer fluid comprises at least one substance having thermal conductivity of at least 0.09 Btu/hr-ft-F.

Additionally, it provides such a heat transfer system, wherein such at least one heat-transfer fluid comprises 1,3-propanediol. Also, it provides such a heat transfer system, wherein such at least one circulator comprises at least one ion exchange purifier structured and arranged to assist ion exchange purification of such at least one heat-transfer fluid. In addition, it provides such a heat transfer system, wherein such at least one circulator comprises at least one membrane filter structured and arranged to assist membrane filtration of such at least one heat-transfer fluid.

And, it provides such a heat transfer system, wherein such at least one heat-transfer fluid comprises at least one heat-transfer fluid adapted to transfer heat, without substantial chemical breakdown, at temperatures of about 125 degrees Celsius to about 215 degrees Celsius. Further, it provides such a heat transfer system, wherein such at least one heat-transfer fluid comprises at least one heat-transfer fluid adapted to transfer heat, without substantial chemical breakdown, at temperatures of about 150 degrees Celsius to about 200 degrees Celsius degrees Celsius.

In accordance with another preferred embodiment hereof, this invention provides a heat transfer system comprising: at least one heat-transfer fluid adapted to transfer heat, without substantial chemical breakdown, at temperatures of about 100 degrees Celsius to about 225 degrees Celsius; at least one industrial processor structured and arranged to provide endothermic industrial processing; at least one heater structured and arranged to controllably transfer heat to such at least one heat-transfer fluid; at least one heat transfer element structured and arranged to controllably transfer heat from such at least one heat-transfer fluid to such at least one industrial processor; at least one circulator structured and arranged to circulate such at least one heat-transfer fluid among such at least one heater and such at least one heat transfer element; wherein such at least one circulator comprises at least one membrane filter structured and arranged to assist membrane filtration of such at least one heat-transfer fluid.

Even further, it provides such a heat transfer system, wherein such at least one heat-transfer fluid comprises at least one heat-transfer fluid adapted to transfer heat, without substantial chemical breakdown, at temperatures of about 125 degrees Celsius to about 215 degrees Celsius. Moreover, it provides such a heat transfer system, wherein such at least one heat-transfer fluid comprises at least one heat-transfer fluid adapted to transfer heat, without substantial chemical breakdown, at temperatures of about 150 degrees Celsius to about 200 degrees Celsius degrees Celsius.

In accordance with another preferred embodiment hereof, this invention provides a heat transfer system comprising: at least one heat-transfer fluid adapted to transfer heat, without substantial chemical breakdown, at temperatures of about 100 degrees Celsius to about 225 degrees Celsius; at least one industrial processor structured and arranged to provide endothermic industrial processing; at least one heater structured and arranged to controllably transfer heat to such at least one heat-transfer fluid; at least one heat transfer element structured and arranged to controllably transfer heat from such at least one heat-transfer fluid to such at least one industrial processor; at least one circulator structured and arranged to circulate such at least one heat-transfer fluid among such at least one heater and such at least one heat transfer element; wherein such at least one circulator comprises at least ion exchange purifier structured and arranged to assist ion exchange purification of such at least one heat-transfer fluid.

Additionally, it provides such a heat transfer system, wherein such at least one heat-transfer fluid comprises at least one heat-transfer fluid adapted to transfer heat, without substantial chemical breakdown, at temperatures of about 125 degrees Celsius to about 215 degrees Celsius. Also, it provides such a heat transfer system, wherein such at least one heat-transfer fluid comprises at least one heat-transfer fluid adapted to transfer heat, without substantial chemical breakdown, at temperatures of about 150 degrees Celsius to about 200 degrees Celsius degrees Celsius.

In accordance with another preferred embodiment hereof, this invention provides a heat transfer system comprising: at least one heat-transfer fluid adapted to transfer heat, without substantial chemical breakdown, at temperatures of about 100 degrees Celsius to about 225 degrees Celsius; at least one industrial processor structured and arranged to provide endothermic industrial processing; at least one heater structured and arranged to controllably transfer heat to such at least one heat-transfer fluid; at least one heat transfer element structured and arranged to controllably transfer heat from such at least one heat-transfer fluid to such at least one industrial processor; at least one circulator structured and arranged to circulate such at least one heat-transfer fluid among such at least one heater and such at least one heat transfer element; wherein such at least one heat-transfer fluid comprises 1,3-propanediol.

In accordance with another preferred embodiment hereof, this invention provides a heat-transfer system comprising the steps of: selecting at least one endothermic industrial process, wherein long-chain hydrocarbon heat-transfer fluids circulate among heater means for heating such heat-transfer fluids and heat transfer means for transferring heat to such endothermic industrial process, wherein such heat-transfer fluids circulate at temperatures of about 100 degrees Celsius to about 225 degrees Celsius; substantially removing such long-chain hydrocarbon heat transfer fluids from such circulation; introducing, into such circulation, heat-transfer fluids comprising no substantial fraction of hydrocarbons; and operating such heat transfer system serving such endothermic industrial process with such introduced heat-transfer fluids.

In addition, it provides such a heat-transfer system, wherein such introduced heat-transfer fluids, comprising no substantial fraction of hydrocarbons, comprise at least one water-miscible fluid adapted to permit essentially full solubility in water of such heat-transfer fluids. And, it provides such a heat-transfer system, wherein such introduced heat-transfer fluids comprise at least one substance having thermal conductivity of at least 0.09 Btu/hr-ft-F. Further, it provides such a heat-transfer system, wherein such introduced heat-transfer fluids comprise essentially at least one diol. Even further, it provides such a heat-transfer system, wherein such introduced heat-transfer fluids comprises essentially 1,3-propanediol.

Moreover, it provides such a heat-transfer system, further comprising the step of assisting ion exchange purification of such introduced heat-transfer fluids. Additionally, it provides such a heat-transfer system, further comprising the step of assisting membrane filtration of such introduced heat-transfer fluids. Also, it provides such a heat transfer system, wherein such step of selecting comprises the step of selecting at least one endothermic industrial process, wherein long-chain hydrocarbon heat-transfer fluids circulate among heater means for heating such heat-transfer fluids and heat transfer means for transferring heat to such endothermic industrial process, wherein such heat-transfer fluids circulate at temperatures of about 125 degrees Celsius to about 215 degrees Celsius. In addition, it provides such a heat transfer system, wherein such step of selecting comprises the step of selecting at least one endothermic industrial process, wherein long-chain hydrocarbon heat-transfer fluids circulate among heater means for heating such heat-transfer fluids and heat transfer means for transferring heat to such endothermic industrial process, wherein such heat-transfer fluids circulate at temperatures of about 150 degrees Celsius to about 200 degrees Celsius.

In accordance with another preferred embodiment hereof, this invention provides a heat-transfer system comprising the steps of: selecting at least one endothermic industrial process whose typical design circulates long-chain hydrocarbon heat-transfer fluids among heater means for heating such heat-transfer fluids and heat transfer means for transferring heat to such endothermic industrial process, wherein such heat-transfer fluids circulate at temperatures of about 100 degrees Celsius to about 225 degrees Celsius; introducing, into such circulation, heat-transfer fluids comprising no substantial fraction of hydrocarbons; and operating such heat transfer system serving such endothermic industrial processing with such introduced heat-transfer fluids.

And, it provides such a heat-transfer system, wherein such introduced heat-transfer fluids, comprising no substantial fraction of hydrocarbons, comprise at least one water-miscible fluid adapted to permit essentially full solubility in water of such heat-transfer fluids. Further, it provides such a heat-transfer system, wherein such introduced heat-transfer fluids comprise at least one substance having thermal conductivity of at least 0.09 Btu/hr-ft-F. Even further, it provides such a heat-transfer system, wherein such introduced heat-transfer fluids comprise essentially at least one diol. Moreover, it provides such a heat-transfer system, wherein such introduced heat-transfer fluids comprise essentially 1,3-propanediol. Additionally, it provides such a heat-transfer system, further comprising the step of assisting ion exchange purification of such introduced heat-transfer fluids. Also, it provides such a heat-transfer system, further comprising the step of assisting membrane filtration of such introduced heat-transfer fluids.

In addition, it provides such a heat transfer system, wherein such step of selecting comprises the step of selecting at least one endothermic industrial process whose typical design circulates long-chain hydrocarbon heat-transfer fluids among heater means for heating such heat-transfer fluids and heat transfer means for transferring heat to such endothermic industrial process, wherein such heat-transfer fluids circulate at temperatures of about 125 degrees Celsius to about 215 degrees Celsius.

And, it provides such a heat transfer system, wherein such step of selecting comprises the step of selecting at least one endothermic industrial process whose typical design circulates long-chain hydrocarbon heat-transfer fluids among heater means for heating such heat-transfer fluids and heat transfer means for transferring heat to such endothermic industrial process, wherein such heat-transfer fluids circulate at temperatures of about 150 degrees Celsius to about 200 degrees Celsius.

In accordance with another preferred embodiment hereof, this invention provides a heat-transfer system comprising the steps of: selecting at least one endothermic industrial process, wherein long-chain hydrocarbon heat-transfer fluids circulate among heater means for heating such heat-transfer fluids and heat transfer means for transferring heat to such endothermic industrial process, wherein such heat-transfer fluids circulate at temperatures of about 100 degrees Celsius to about 225 degrees Celsius; assessing at least three factor sets of seven factor sets of energy use factors involving such at least one heat transfer system, safety factors involving such at least one heat transfer system, fluid life factors involving such at least one heat transfer system, corrosion factors involving such at least one heat transfer system, ease of maintenance of such heat transfer fluids, toxicity factors involving such at least one heat transfer system, and economic factors involving such at least one heat transfer system; and based on such assessments, substantially replacing such long-chain hydrocarbon heat-transfer fluids with heat-transfer fluids comprising no substantial fraction of hydrocarbons; and operating such at least one heat transfer system serving such endothermic industrial processing with such replaced heat-transfer fluids.

Further, it provides such a heat-transfer system, wherein such replaced heat-transfer fluids, comprising no substantial fraction of hydrocarbons, comprise at least one water-miscible fluid adapted to permit essentially full solubility in water of such heat-transfer fluids. Even further, it provides such a heat-transfer system, wherein such replaced heat-transfer fluids comprise at least one substance having thermal conductivity of at least 0.09 Btu/hr-ft-F. Moreover, it provides such a heat-transfer system, wherein such replaced heat-transfer fluids comprise essentially at least one diol. Additionally, it provides such a heat-transfer system, wherein such replaced heat-transfer fluids comprise essentially 1,3-propanediol. Also, it provides such a heat-transfer system, further comprising the step of assisting ion exchange purification of such replaced heat-transfer fluids. In addition, it provides such a heat-transfer system, further comprising the step of assisting membrane filtration of such introduced heat-transfer fluids.

And, it provides such a heat transfer system, wherein such step of selecting comprises the step of selecting at least one endothermic industrial process whose typical design circulates long-chain hydrocarbon heat-transfer fluids among heater means for heating such heat-transfer fluids and heat transfer means for transferring heat to such endothermic industrial process, wherein such heat-transfer fluids circulate at temperatures of about 125 degrees Celsius to about 215 degrees Celsius.

Further, it provides such a heat transfer system, wherein such step of selecting comprises the step of selecting at least one endothermic industrial process whose typical design circulates long-chain hydrocarbon heat-transfer fluids among heater means for heating such heat-transfer fluids and heat transfer means for transferring heat to such endothermic industrial process, wherein such heat-transfer fluids circulate at temperatures of about 150 degrees Celsius to about 200 degrees Celsius.

In accordance with another preferred embodiment hereof, this invention provides a heat-transfer system comprising the steps of: selecting at least one endothermic industrial process whose typical design circulates long-chain hydrocarbon heat-transfer fluids among heater means for heating such heat-transfer fluids and heat transfer means for transferring heat to such endothermic industrial process, wherein such heat-transfer fluids circulate at temperatures of about 100 degrees Celsius to about 225 degrees Celsius; assessing at least three factor sets of energy use factors involving such at least one heat transfer system, safety factors involving such at least one heat transfer system, fluid life factors involving such at least one heat transfer system, corrosion factors involving such at least one heat transfer system, ease of maintenance of such heat transfer fluids, toxicity factors involving such at least one heat transfer system, and economic factors involving such at least one heat transfer system; and based substantially on such assessments, using with such heat transfer systems chosen heat-transfer fluids comprising no substantial fraction of hydrocarbons; and operating such at least one heat transfer system serving such endothermic industrial processing with such chosen heat-transfer fluids.

Even further, it provides such a heat-transfer system, wherein such chosen heat-transfer fluids, comprising no substantial fraction of hydrocarbons, comprise at least one water-miscible fluid adapted to permit essentially full solubility in water of such heat-transfer fluids. Even further, it provides such a heat-transfer system, wherein such chosen heat-transfer fluids comprise at least one substance having thermal conductivity of at least 0.09 Btu/hr-ft-F. Even further, it provides such a heat-transfer system, wherein such chosen heat-transfer fluids comprise essentially at least one diol. Even further, it provides such a heat-transfer system, wherein such chosen heat-transfer fluids comprise essentially 1,3-propanediol. Even further, it provides such a heat-transfer system, further comprising the step of assisting ion exchange purification of such chosen heat-transfer fluids. Even further, it provides such a heat-transfer system, further comprising the step of assisting membrane filtration of such introduced heat-transfer fluids.

Even further, it provides such a heat transfer system, wherein such step of selecting comprises the step of selecting at least one endothermic industrial process whose typical design circulates long-chain hydrocarbon heat-transfer fluids among heater means for heating such heat-transfer fluids and heat transfer means for transferring heat to such endothermic industrial process, wherein such heat-transfer fluids circulate at temperatures of about 125 degrees Celsius to about 215 degrees Celsius. Even further, it provides such a heat transfer system, wherein such step of selecting comprises the step of selecting at least one endothermic industrial process whose typical design circulates long-chain hydrocarbon heat-transfer fluids among heater means for heating such heat-transfer fluids and heat transfer means for transferring heat to such endothermic industrial process, wherein such heat-transfer fluids circulate at temperatures of about 150 degrees Celsius to about 200 degrees Celsius.

Even further, it provides such heat transfer systems wherein such heat transfer system comprises at least one heat transfer system structured and arranged to serve at least one paper manufacturing industrial processor. Even further, it provides such heat transfer systems wherein such heat transfer system comprises at least one heat transfer system structured and arranged to serve at least one pulp processing industrial processor. Even further, it provides such heat transfer systems wherein such heat transfer system comprises at least one heat transfer system structured and arranged to serve at least one textile processing industrial processor. Even further, it provides such heat transfer systems wherein such heat transfer system comprises at least one heat transfer system structured and arranged to serve at least one plastics processing industrial processor.

BRIEF DESCRIPTION OF THE DRAWINGS

FIG. 2 shows the chemical structure of 1,3-propanediol (sometimes hereinafter called "PDO").

FIG. 3 shows a chart comparing the maximum temperatures of oil, water and PDO.

FIG. 4 shows a table comparing the thermal conductivity of PDO to an oil heat-transfer fluid marketed as Mobiltherm 603™.

DETAILED DESCRIPTION OF THE BEST MODES AND PREFERRED EMBODIMENTS OF THE INVENTION

Figure 1:
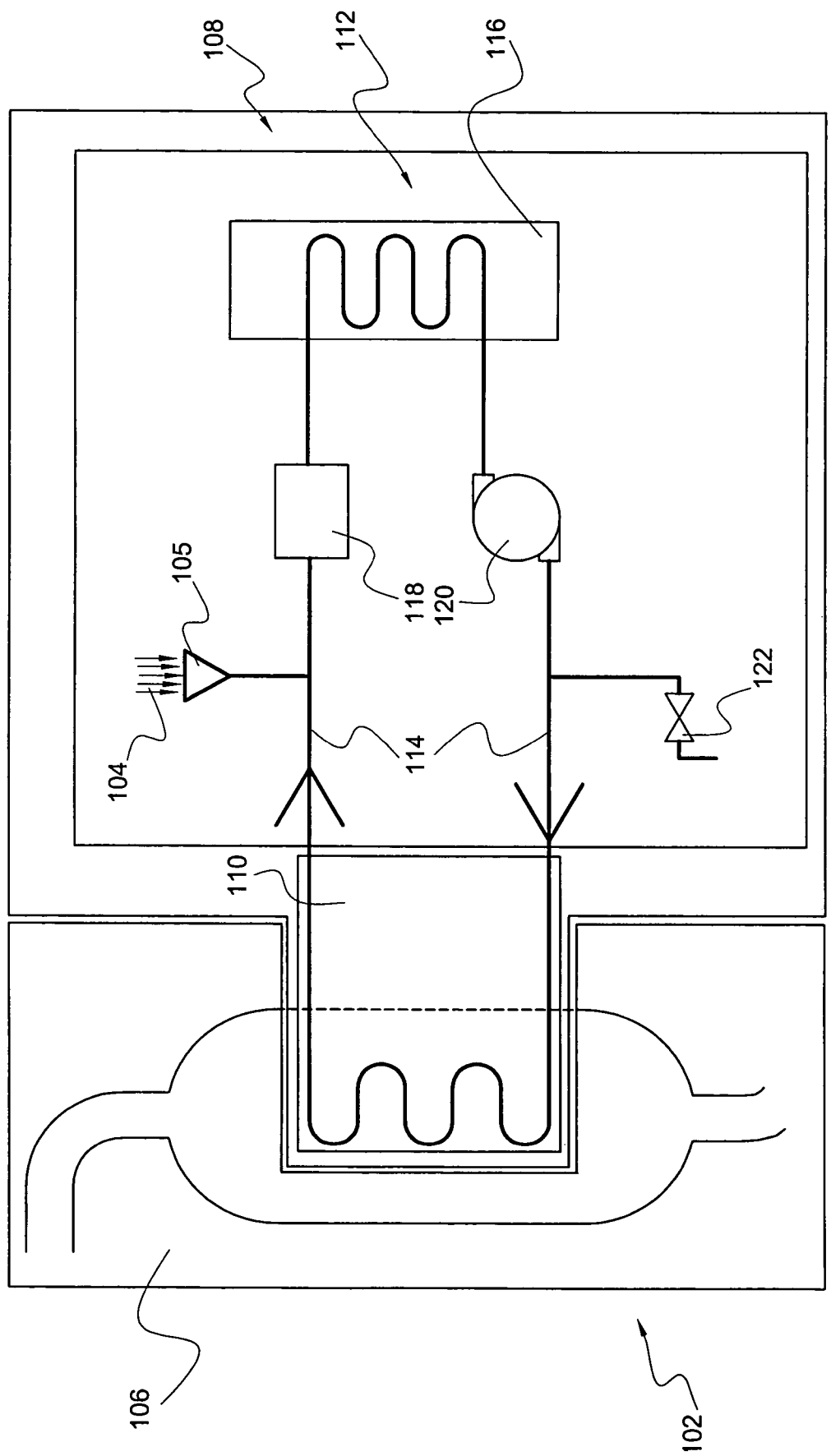
FIG. 1 shows a diagrammatic representation of a heat-transfer system according to a preferred embodiment of the present invention.

FIG. 1 is a diagrammatic representation of the heat-transfer system, according to a preferred embodiment of the present invention. Preferably, heat-transfer system 102 comprises heat-transfer fluid 104 (at least embodying herein heat-transfer fluid means for transferring heat, without substantial chemical breakdown, at temperatures of about 150 degrees Celsius to about 200 degrees Celsius); endothermic industrial processor 106 (at least embodying herein industrial processor means for endothermic industrial processing); heater 116 (at least embodying herein heater means for controllably transferring heat to said heat-transfer fluid means); heat-transfer element 110 (at least embodying herein heat transfer means for controllably transferring heat from said heat-transfer fluid means to said industrial processor means); and circulator 114 (at least embodying herein circulating means for circulating said heat-transfer fluid means among said heater means and said heat transfer means), as shown. Upon reading the teachings of this specification, those of ordinary skill in the art will now understand that, under appropriate circumstances, such as user preference, advances in technology, intended use, etc., other components, such as filters, reservoirs, cooling fins, etc., may suffice.

Preferably, circulator 114 is filled with heat-transfer fluid 104 utilizing fluid entrance 105, as shown. Preferably, heat-transfer fluid 104 is delivered to endothermic industrial processor 106, via heat-transfer element 110, as shown. Preferably, endothermic industrial processor 106 is an apparatus for accomplishing an endothermic industrial process, such as, for example, paper pulp digestion, where large amounts of energy must be added to wood chips in order to break the wood chips down into celluloid pulp. Upon reading the teachings of this specification, those of ordinary skill in the art will now understand that, under appropriate circumstances, such as user preference, advances in technology, intended use, etc., other processes requiring heat transfer, such as exothermic processes, etc., may suffice.

Endothermic industrial processes use heat-transfer fluids to transfer heat from a heater to an endothermic process. Various industrial endothermic processes may use various temperature ranges, and a heat-transfer fluid is used which is suitable to the required temperatures. For example, water is commonly chosen as a heat-transfer fluid for endothermic industrial processes operating at less than 100 degrees Celsius.

One of ordinary skill in the art would recognize that the heat transfer fluid of the invention is applicable to endothermic industrial processes or other industrial processes that involve the transfer of heat in the system.

For temperatures greater than 100 degrees Celsius, hydrocarbon heat-transfer fluids are commonly used. Hydrocarbon heat-transfer fluids can be chosen to suit many operating temperature ranges. Hydrocarbon molecules consist exclusively of hydrogen and carbon. Hydrocarbon fluids typically comprise saturated long chain hydrocarbons of more than 15 carbons. Hydrocarbon heat-transfer fluids are more commonly paraffinic oils comprising saturated unbranched chains of between 18 and 40 carbons. Upon reading the teachings of this specification, those of ordinary skill in the art will now understand that, under appropriate circumstances, such as user preference, advances in technology, intended use, etc., other hydrocarbons, such as branched hydrocarbon chains, longer chains, etc., may suffice.

Hydrocarbon heat-transfer fluids are dangerous to use because of the high risk of fire. In many large-scale industrial fires with large losses, heating, power and cooling fluids are the primary cause. The dangers present in these systems are high pressure, the fluid itself, and the presence of ignition sources such as sparks and hot surfaces. In many cases, the industrial process is such that it presents a risk for ignition to any spillage or leakage of fluid. The pressure can vary from a few bars up to hundreds of bars, which means that a leakage on a pressurized vessel or pipe produces a fine mist of highly ignitable oil. Such an oil mist can, if ignited, spread a fire to large areas and endanger both equipment and human life. Hydrocarbons are highly flammable, and hydrocarbon fires cannot be extinguished with water.

FIG. 2 demonstrates the chemical structure of PDO (1,3-propanediol). PDO is a useful heat-transfer fluid throughout its liquid-state temperature range, nominally from about minus 27 degrees Celsius to about 214 degrees Celsius, which range varies with pressure in the usual manner. The PDO is more resistant (at any given temperature and pressure) to chemical breakdown than ethylene glycol or propylene glycol.

Although PDO (and other fluids of this invention as herein discussed) is presently most useful as a substitute heat exchange fluid for hot oil (given also that endothermic chemical reactions utilizing hot oil are being typically run at somewhat lower temperatures than historically) in temperature ranges where the PDO may be currently a unique practical choice, i.e., from about 150 to about 200 degrees Celsius, such fluids of this invention may be utilized within larger (typically less preferable) ranges.

For example, PDO is additionally useful as a heat-transfer fluid in the temperature range of about 100 (the boiling point of water, i.e., beginning a range where water-substitutes like ethylene glycol, which is not as stable as PDO, might be used) to about 225 degrees Celsius, a practical maximum for PDO even under slight pressures (at least embodying herein heat-transfer fluid means for transferring heat, without substantial chemical breakdown, at temperatures of about 100 degrees Celsius to about 225 degrees Celsius). Used at these temperatures, PDO is more resistant to chemical breakdown than other heat-transfer fluids such as, for example, oil, ethylene glycol and propylene glycol.

PDO is even more useful as a heat-transfer fluid in the temperature range of about 125 to about 215 degrees Celsius, (at least embodying herein heat-transfer fluid means for transferring heat, without substantial chemical breakdown, at temperatures of about 125 degrees Celsius to about 215 degrees Celsius) because PDO is substantially more resistant to chemical breakdown than other heat-transfer fluids such as, for example, oil, ethylene glycol and propylene glycol, used at these temperatures. Pressurizing needs, which exist for water as well as the mentioned glycols, do not exist for PDO.

As mentioned, PDO is especially desirable and preferred for use in industrial heat-transfer systems at temperatures in the range of about 150 to about 200 degrees Celsius, which is a commercially used temperature range for hydrocarbon heat-transfer fluids that is generally inaccessible to ethylene glycol or propylene glycol heat-transfer fluids due to excessive chemical breakdown.

It should be noted that under non-preferred circumstances, PDO may be a useful industrial heat-transfer fluid for use in heat-transfer systems serving endothermic industrial processes not operating above about 100 degrees Celsius. For example, industrial food-drying processes may use the heat-transfer systems of the instant invention utilizing heat-transfer fluids at, for example, 90 degrees Celsius.

Typical industrial heat-transfer systems lose 5-10% or more of their heat-transfer fluid temperature between the heat-transfer fluid heater and the endothermic industrial process heat exchanger. Also, it is often desirable to have the heat-transfer system at a substantially higher temperature than the endothermic industrial process in order to effect faster heat-transfer rates from the heat-transfer system to the endothermic industrial process than is possible at a lower temperature differential. Therefore, the heat-transfer fluid of the heat-transfer system of the instant invention may need to be heated to a higher temperature than the endothermic industrial process served by the heat-transfer system. For example, to serve the needs of the elsewhere mentioned Kraft system (about 166 degrees Celsius), the heat-transfer fluids may well require most of the herein most preferred range of 150-200 degrees Celsius.

It should also be noted that the boiling point of PDO, like any liquid, increases under pressure. Therefore, for endothermic industrial process heat-transfer systems under pressure, PDO may be a useful heat-transfer fluid at temperatures over 215 degrees Celsius. For example, the boiling point of PDO increases about 1.5 degrees Celsius for every one psi over standard atmospheric pressure. So, pressurized heat-transfer systems of the instant invention may be preferred over pressurized or un-pressurized hydrocarbon heat-transfer systems at, for example, 225 degrees Celsius, because of the increased fire safety of the water-miscible heat-transfer system versus oil heat-transfer systems.

Although some oils can operate at higher temperatures than PDO, oils require substantially more time to heat up and cool down than PDO, because oil has a lower thermal conductivity than PDO.

PDO is available in quantity from Shell Chemicals LP of Houston, Tex., USA. Shell's datasheet on 1,3-propanediol (PDO) is presented below wherein Shell Chemicals provides the following information about the properties of 1,3-Propandiol (PDO) as manufactured by Shell:

Physical Properties

| | |
|---|---|
| CAS Registry Number | 504-63-2 |
| Molecular formula | C3H8O2 |
| Molecular weight | 76.10 |
| Boiling point | 214.4° C. (417.9° F.) at 760 mm Hg |
| | 103.0° C. (217.4° F.) at 10 mm Hg |
| Melting point | −26.7° C. (−16.1° F.) |
| Refractive index, | 25° C. 1.4386 |
| Density, | 20° C. 1.0526 g cm-3 |
| Viscosity, | 20° C., cP 52 |
| Surface tension, | 20° C. 46.2 Dyne-1 cm |
| Solubility in water | Complete |
| Flash point, | ASTM D-92 129° C. (265° F.) |
| Evaporation rate, | nBuAc = 1 0.016 |
| Hildebrand solubility parameter, | 25° C. 15.2 (cal cm-3)1/2 |
| Fractional polarity | 0.47 |
| Hansen solubility parameters, | 25° C. δd = 6.1 (cal cm-3)1/2 |
| | δp = 6.9 (cal cm-3)1/2 |
| | δh = 13.2 (cal cm-3)1/2 |
| 1,3-Propanediol | HOCH2CH2CH2OH |

Specified Properties

| Property | Minimum Limit | Maximum Limit | Method |
|---|---|---|---|
| Purity, % by GC | 99.7 | 100 | SCG-305 |
| Color, Pt—Co | 0 | 20 | ASTM-D1209 |
| Water, % w | 0 | 0.1 | ASTM-D4672 |
| Appearance; | | | |
| Substantially free of suspended matter | Pass | Pass | ASTM-D4176 |
| Typical properties | | | |
| Ash, | | ppm <10 | |
| Carbonyls, | | ppm, as C=O <1000 | |
| Chlorides, | | as Cl, ppm <0.5 | |
| Iron, | | ppm <0.1 | |
| Acidity, | | as acetic acid, % w <0.002 | |

Above MSDS is © Copyright Shell 2001.

Experimental data indicates that PDO heat-transfer fluids are in many respects superior to hydrocarbon heat-transfer fluids for the temperature range of 100 to 150 degrees Celsius. Experiments demonstrate that PDO resists oxidation and degradation at these temperatures over time significantly better than either propylene glycol or ethylene glycol. A research article, "A Chemical Base for Engine Coolant/Antifreeze with Improved Thermal Stability Properties" by Edward Eaton, W. H. Boon, and Chris J. Smith, herein incorporated by reference in its entirety, is also set forth in part later in this specification in relation to FIGS. 10, 11, and 12.

PDO provides greater high temperature stability, corrosion resistance, and lower toxicity than the hydrocarbon heat-transfer fluids historically used to heat endothermic industrial processes. PDO provides faster heat transfer, greater oxidation and degradation resistance, and easer means of fire suppression than conventional hydrocarbon heat-transfer fluids.

FIG. 3 is a chart comparing the temperatures of water, oil and PDO, over the same heating process. The experiment involved heating the fluids in 500 ml cylindrical beakers on a hot plate. The hot plate was set at maximum temperature, and the system was open to the air.

FIG. 4 is a table comparing the thermal conductivity of PDO to a paraffinic oil marketed as Mobiltherm 603™, available from Exxon Mobil Corporation, of Fairfax, Va., USA. PDO transfers heat at a higher rate than Mobiltherm 603 paraffinic oil, as shown. PDO transfers heat at a higher rate than paraffinic oils, in general. This may permit PDO heat-transfer systems to transfer heat to the endothermic process more quickly than oil heat-transfer systems, resulting in faster process heating times. Also, it may be possible to use a smaller volume of the heat-transfer fluid of this invention, flowing at a higher rate, to accomplish the same thermal change in the endothermic process as conventional heat transfer oil. This results in more efficient endothermic processes, lower heat-transfer fluid volumes, and lower heating fuel costs, as compared to conventional oil heat-transfer systems.

The heat-transfer fluid of this invention comprises a heat-transfer fluid with no substantial hydrocarbon fraction. The heat-transfer fluid of this invention further comprises a heat-transfer fluid with a thermal conductivity of at least about 0.09 Btu/hr-ft-F. Preferably, the heat-transfer fluid comprises a heat-transfer fluid capable of operating without substantial breakdown at temperatures from about 150 degrees Celsius to about 200 degrees Celsius. More preferably, the heat-transfer fluid comprises a water-miscible fluid. Even more preferably, the heat-transfer fluid comprises at least one diol. Most preferably, the heat-transfer fluid comprises 1,3-propanediol (PDO). Upon reading the teachings of this specification, those of ordinary skill in the art will now understand that, under appropriate circumstances, such as user preference, advances in technology, intended use, etc., other fluids, such as fluids having other thermal conductivities, etc., may suffice.

Industrial fire sprinklers, which spray water when activated, are required by law in the United States for all places of business in order to protect lives and property. If a fire is fueled by a non-water-miscible heat-transfer fluid, such as oil, then the sprinklers are ineffective in extinguishing the fire. In fact, attempting to extinguish an oil fire with water may spread the fire, as the burning oil floats away on the sprinkler water to reach other areas. As a result, industrial systems utilizing water-miscible heat-transfer fluids, such as PDO, reduce the risk of fire damage, as compared to industrial systems utilizing oil. Furthermore, reducing the risk of fire in industrial systems provides for lower fire insurance premiums.

For example, industries utilizing ethylene glycol (water-miscible) as opposed to hot oil, for climate control and cooling, have been provided with reduced fire insurance premiums. Alternatively, a company may go to great expense to install a special automatic foam or CO2 fire suppression system. Unfortunately, besides the considerable extra expense, such fire suppression systems are more dangerous to workers and firefighters than water sprinklers.

Preferably, in addition to reducing the risk of fire damage and reducing fire insurance premiums, water-miscible heat-transfer fluid 104 may comprise essentially PDO (at least embodying herein wherein said heat-transfer fluid means comprises essentially 1,3-propanediol), meaning herein that essentially all of the heat transfer functions are performed by the PDO of such heat-transfer fluids, even though such fluids may contain some other accidental substances or very minor amounts of substance "additives" having purposes other than heat transfer, such as corrosion resistance, preservative, dye functions, etc. Upon reading the teachings of this specification, those of ordinary skill in the art will now understand that, under appropriate circumstances, such as user preference, advances in technology, intended use, etc., other additives, such as leak-detection tracers, antioxidants, etc., may suffice.

Preferably, heat-transfer fluid 104 comprises no substantial fraction of hydrocarbons (at least embodying herein wherein said heat-transfer fluid means comprises no substantial fraction of hydrocarbons); and it is noted that the oil left in a system when "emptying" it to replace the oil with PDO shall not be considered a "substantial fraction". Preferably, heat-transfer fluid 104 comprises a water-miscible heat-transfer fluid, which reduces the risk of fire damage (at least embodying herein wherein said heat-transfer fluid means comprises water-miscible means for permitting essentially full solubility in water of said heat-transfer fluid means). Preferably, water-miscible heat-transfer fluid 104 comprises diols (at least embodying herein wherein said heat-transfer fluid means comprises essentially at least one diol). Preferably, water-miscible heat-transfer fluid 104 comprises a material with a thermal conductivity of at least about 0.09 Btu/hr-ft-F (at least embodying herein wherein said heat-transfer fluid means comprises thermal conductivity means for providing to said heat-transfer fluid means thermal conductivity of at least about 0.09 Btu/hr-ft-F). Upon reading the teachings of this specification, those of ordinary skill in the art will now understand that, under appropriate circumstances, considering issues such as corrosion, toxicity, viscosity, fluid life, equipment specifications, fluid color, cost, etc., other elements, such as for example, anti-foam agents, anti-icing additives, anti-wear additives, corrosion inhibitors, demulsifiers, detergents, dispersants, emulsifiers, EP additives, oiliness agents, oxidation inhibitors, pour point depressants, rust inhibitors, tackiness agents, viscosity improvers, preservatives, alcohols, water, dyes, etc., may be added to the water-miscible heat-transfer fluid.

Preferably, heat-transfer fluid 104 is provided to heat-transfer element 110 utilizing circulator 112, such that heat-transfer element 110 provides heat to endothermic industrial process 106, as shown. Preferably, heat-transfer element 110 is a coil heat exchanger, as shown. Upon reading the teachings of this specification, those of ordinary skill in the art will now understand that, under appropriate circumstances, considering issues such as cost, spatial restraints, efficiency, etc., other process heaters, such as for example, forced convection process heaters, plate heat exchangers, spiral heat exchangers, processors not requiring an intermediary fluid such as a chemical treatment, static mixing heat exchangers, hot rollers, etc., may suffice.

Preferably, endothermic industrial processor 106 comprises an endothermic industrial processor for providing substantially continuous processing at temperatures from about 150 degrees Celsius to about 200 degrees Celsius. Upon reading the teachings of this specification, those of ordinary skill in the art will now understand that, under appropriate circumstances, considering issues such as cost, technological advances, equipment requirements, business motivations, etc., other heat-input-dependent processors, such as for example, water treatment facilities, papermaking processors, bio-fluid sterilization processors, plastics processors, food processors, stock preparation processors, hot metal processors, textile processors, agricultural processors, pulp preparation processors, chemical recovery processors, wastewater treatment processors, non-industrial heat-input-dependent processors, etc., may suffice.

Preferably, endothermic industrial processor 106 comprises an industrial chemical processor. Upon reading the teachings of this specification, those of ordinary skill in the art will now understand that, under appropriate circumstances, considering issues such as desired product, cost, etc., other processors, such as for example, metal smelting processors, metal refining processors, plastic manufacturing processors, non-chemical processors, etc., may suffice.

Preferably, endothermic industrial processor 106 comprises an industrial chemical digester processor. Preferably, endothermic industrial processor 106 comprises an industrial chemical digester processor used in manufacturing sugars. Preferably, alternately, endothermic industrial processor 106 comprises an industrial chemical digester processor used in manufacturing paper products. A detailed look at the paper-manufacturing process, including the digester portion of the process (modeling of a Kraft process), is demonstrated in the article "REACTION PROFILE CONTROL OF THE CONTINUOUS PULP DEGESTER", by Francis J. Doyle III and Ferhan Kayihan, Department of Chemical Engineering, University of Delaware, Newark, Del., 19716 (this article is also available in Appendix A of the provisional patent application from which this application claims priority). Upon reading the teachings of this specification, those of ordinary skill in the art will now understand that, under appropriate circumstances, considering issues such as desired product, cost, etc., other processors, such as for example, papermaking processors, paper mill wastewater processors, pulp wash and bleaching processors, chemical recovery processors, steam processors, lignin processors, compost processors, sludge processors, non-digester processors, etc., may suffice.

Figure 5:
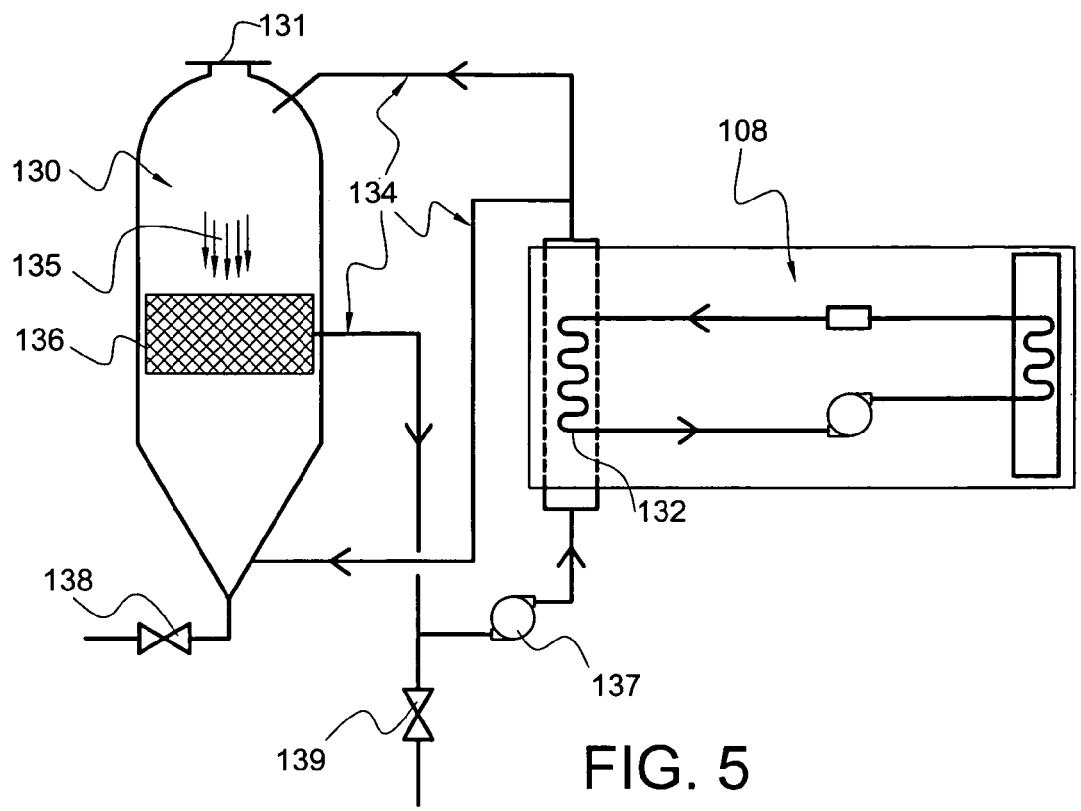
FIG. 5 shows a diagrammatic representation of a heat-transfer system according to another preferred embodiment of the present invention.

As shown in FIG. 5, an industrial chemical digester processor (for manufacturing sugar, e.g.) may comprise a batch digester 130, a heat exchanger 132, and chemical treatment circulation pipes 134, where chemical treatment 135 is circulated through heat exchanger 132, chemical treatment circulation pipes 134, and batch digester 130. Preferably, chemical treatment circulation pipes 134 comprise pump 137 and release valve 139. Typically, batch digester 130 is filled with vegetable materials using opening 131. Typically, batch digester 130 comprises a cooking screen 136, which collects a desired sugar product for purposes of later discharging the sugar product through blow valve 138. Typically, chemical treatment 135 comprises water and lower aliphatic alcohols and/or ketones, for purposes of removing lignin from the vegetable material feedstock. Preferably, heat exchanger 132 transfers heat from heat-transfer fluid 104 into chemical treatment 135, as shown in FIG. 5. Upon reading the teachings of this specification, those of ordinary skill in the art will now understand that, under appropriate circumstances, such as user preference, advances in technology, intended use, etc., other chemical digesters, such as fermenters, etc., may suffice.

Figure 6:
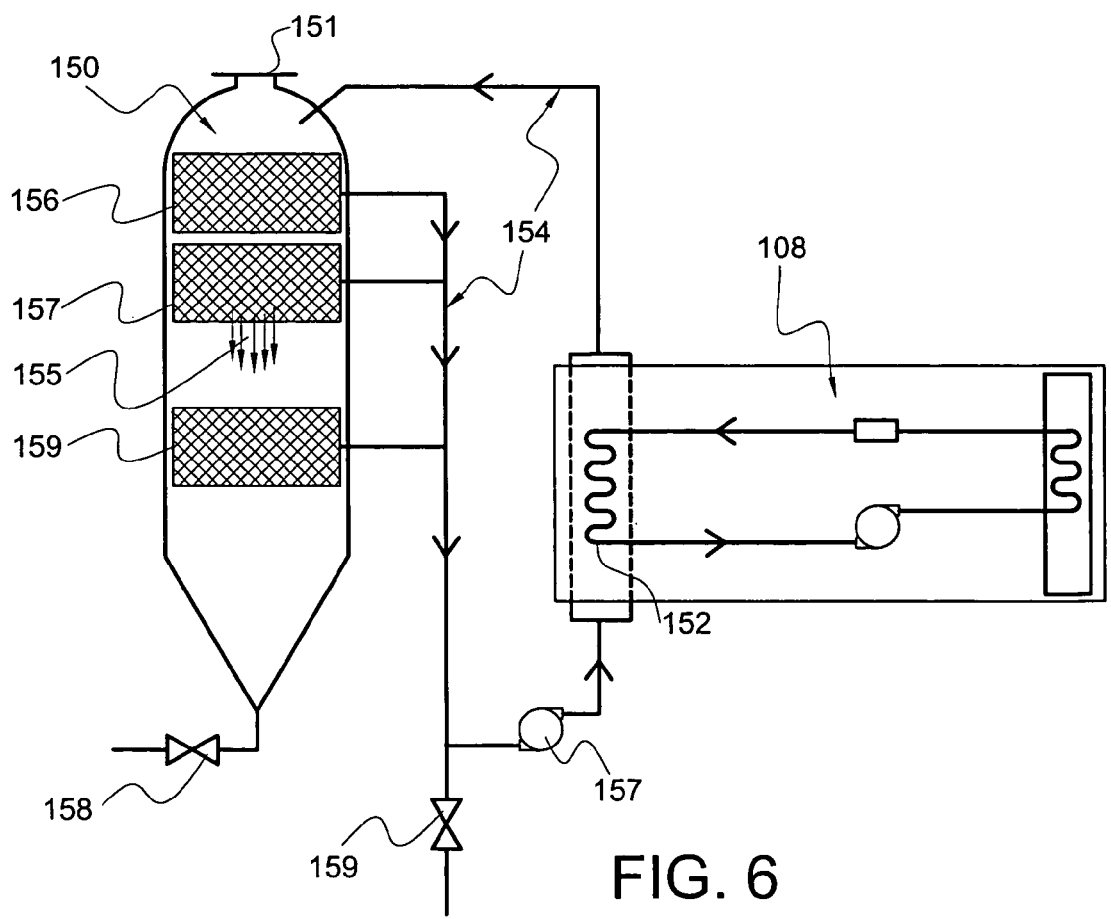
FIG. 6 shows a diagrammatic representation of another heat-transfer system according to another preferred embodiment of the present invention.

Typically, as shown in FIG. 6, an industrial chemical digester processor for manufacturing sugar comprises a continuous digester 150, heat exchangers 152, and chemical treatment circulation pipes 154, where chemical treatment 155 is repeatedly circulated through heat exchangers 152, chemical treatment circulation pipes 154, and continuous digester 150. Preferably, chemical treatment circulation pipes 154 comprise pump 157 and release valve 159. Typically, continuous digester 150 is filled with vegetable material using opening 151. Typically, continuous digester 150 comprises upper cooking screen 156, lower cooking screen 157, and extraction screen 159, which collect a desired sugar product for purposes of later discharging the sugar product through blow valve 158. Typically, chemical treatment 155 comprises water and lower aliphatic alcohols and/or ketones, for purposes of removing lignin from the vegetable material. Preferably, heat exchanger 152 transfers heat from heat-transfer fluid 104 into chemical treatment 155, as shown in FIG. 6.

As shown in FIG. 5, an industrial chemical digester processor for manufacturing paper products may comprise a batch digester 130, a heat exchanger 132, and chemical treatment circulation pipes 134, where chemical treatment 135 is circulated through heat exchanger 132, chemical treatment pipes 134 and batch digester 130. Preferably, chemical treatment circulation pipes 134 comprise pump 137 and release valve 139. Typically, batch digester 130 is filled with wood chips using opening 131. Typically, batch digester 130 comprises a cooking screen 136, which collects a desired pulp product for purposes of later discharging the pulp product through blow valve 138. Typically, chemical treatment 135 comprises sodium hydroxide and sodium sulfide, for purposes of removing lignin from the wood chips. Preferably, heat exchanger 132 transfers heat from heat-transfer fluid 104 into chemical treatment 135, as shown in FIG. 5.

Typically, as shown in FIG. 6, an industrial chemical digester processor for manufacturing paper products comprises a continuous digester 150, heat exchangers 152 and chemical treatment circulation pipes 154, where chemical treatment 155 is repeatedly circulated through heat exchangers 152, chemical treatment circulation pipes 154 and continuous digester 150. Preferably, chemical treatment circulation pipes 154 comprise pump 157 and release valve 159. Typically, continuous digester 150 is filled with wood chips using opening 151. Typically, continuous digester 150 comprises upper cooking screen 156, lower cooking screen 157 and extraction screen 159, which collect a desired pulp product for purposes of later discharging the pulp product through blow valve 158. Typically, chemical treatment 155 comprises sodium hydroxide and sodium sulfide, for purposes of removing lignin from the wood chips. Preferably, heat exchanger 152 transfers heat from heat-transfer fluid 104 into chemical treatment 135, as shown in FIG. 6.

Preferably, for purposes of manufacturing paper products, endothermic industrial processor 106 (FIG. 1) is a Kraft continuous digester. Typically, chemical pulp is produced using continuous digesters. Generally, "Kraft pulping", which uses a continuous digester, is the most commonly used chemical pulping process.

Figure 9:
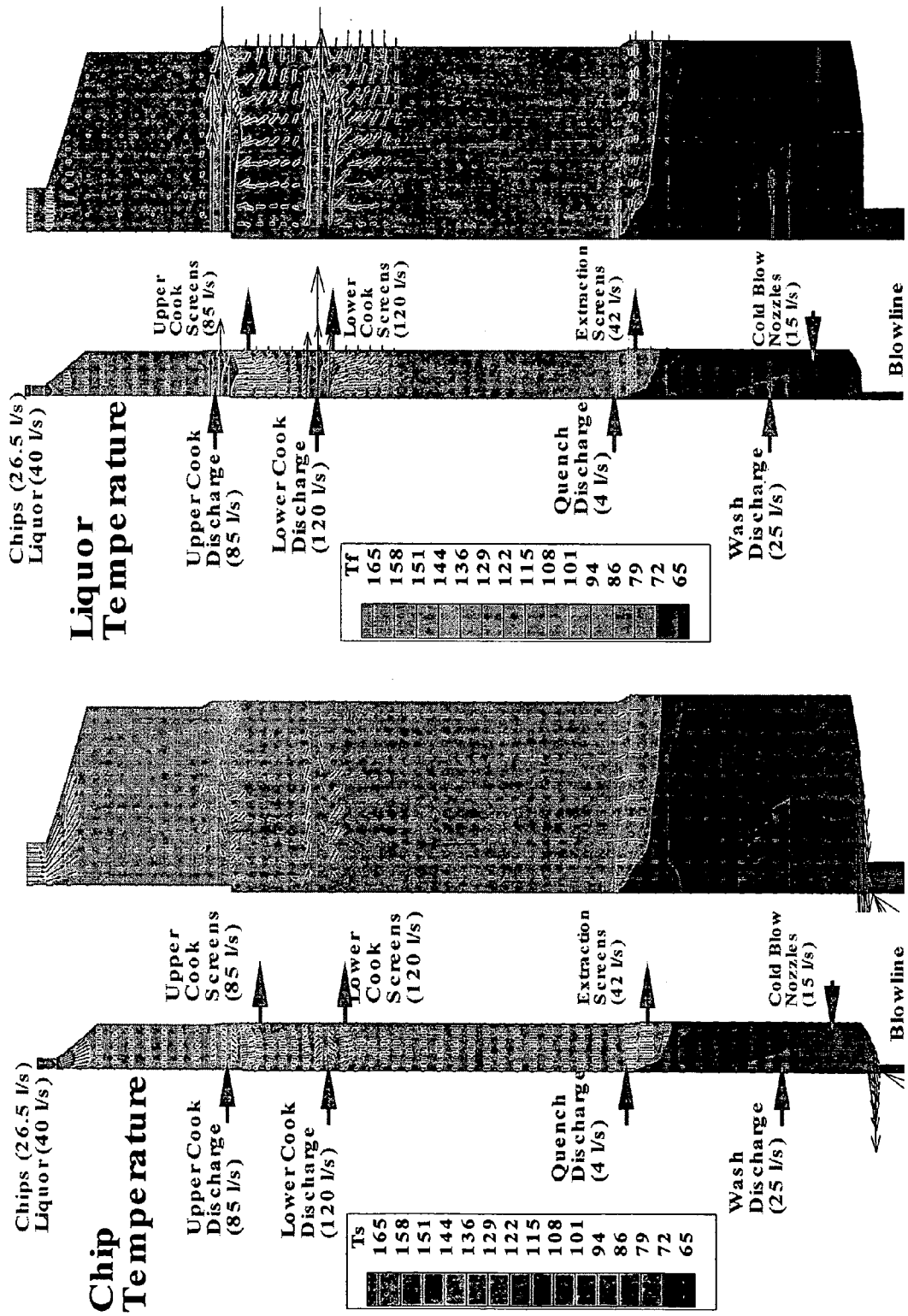
FIG. 9 shows a diagram of chip and liquor temperatures in a typical Kraft pulp digester.

FIG. 9 reproduces a chart of chip and liquor temperatures from the conference presentation "MODELING OF KRAFT TWO-PHASE DIGESTER PULP PROCESSES", by P. He, M. Salcudean, I. Gartshore, and E. L. Bibeau, Engineering/Process & Product Quality Conference and Trade Fair, Sep. 12-16, 1999, Hilton Anaheim (this presentation is also available in Appendix A of the provisional patent application from which this application claims priority). Maximum temperatures in the Kraft two-phase digester reach about 166.6° C., requiring that heat-transfer fluid 104 achieve temperatures substantially above 166.6° C. Although oil and PDO are both capable of achieving such temperatures, the thermal conductivity of PDO, as shown in FIG. 4, is about 67% greater than oil. As a result, less time is required to heat a system utilizing PDO, than a system utilizing oil.

Digesters are very capital intensive ($50-$100 million), yet their performance is of paramount importance to maximize the produced pulp quality and yield, reduce the overall operating costs, and minimize the adverse environmental impacts of pulp mills. More pulp and paper companies are replacing their pulping processes with modern fiberlines using continuous digesters to meet increasing competitiveness in the global market place and tighter environmental regulations (Doyle, U. of Delaware).

Some of the challenging characteristics of these reactors which preclude efficient control include: (i) long residence times (on the order of 10 hours), (ii) complex nonlinear dynamic behavior, (iii) key process variables are un-measurable in real-time, and (iv) the biological feedstock varies stochastically. The key quality variable is the Kappa number, which represents the degree of delignification. Consequently, this quantity is directly correlated with the extent of reaction (Doyle, U. of Delaware).

Due to complex chemical phenomena and the fact that wood chips are non-uniform and constantly changing, regulating product quality in a digester is a non-trivial task. Wet chips are steamed to remove air in the pores and fed into the impregnation vessel (IV) together with white liquor. In the impregnation vessel, white liquor penetrates into the chips and equilibrates with initial moisture for about 30 minutes depending on the production rate. In the IV, both chips and liquor move in the co-current downward direction. From the IV, the chips are carried into the top section of the digester with hot liquor that brings the mixture to the desired reaction temperature. The top section of the digester, referred to as the cook zone, is a co-current section where the main reactions take place. Chips react from inside out owing to the significant internal pore volume and associated reactive surface area. Therefore, overall reaction rates depend on the concentration levels of entrapped liquor and the diffusion rates from free liquor that replenish the active ingredient holdup in the pores. Spent liquor saturated with dissolved solids at the end of the cook zone is extracted for chemical recovery elsewhere in the mill. Chips follow into the MCC (modified continuous cooking) and the EMCC zones, now counter-current to fresh dilute white liquor which simultaneously continue mild delignification reactions and extract valuable inorganic solids from the pores of chips.

As packed reactors, digesters are very unique in that the packing (main ingredient of the process) is continuously in motion, non-uniform in size, and has a variable residence time distribution through variable compaction both with respect to conversion and differential head pressure. Extent of reaction, defined through the blow-line (exit) Kappa number, is the major performance measurement. Other important factors are the yield of the process and the fiber properties of the final product. Although various operating conditions may yield the same Kappa number, important fiber properties like strength are reaction path dependent (Doyle, U. of Delaware).

Preferably, endothermic industrial processor 106 comprises endothermic industrial textile or plastics processor. For example, oil heated laminators, heat transfer rolls, and precision calendars used in textile and plastics manufacturing may be used according to the present invention. Upon reading the teachings of this specification, those of ordinary skill in the art will now understand that, under appropriate circumstances, such as user preference, advances in technology, intended use, etc., other endothermic industrial textile or plastics processors, such as mangles, dryers, etc., may suffice.

Preferably, heat-transfer fluid 104 is initially heated by heater 116, as shown. Preferably, heater 116 utilizes a boiler configuration. Preferably, heater 116 utilizes an open-flame boiler configuration. Upon reading the teachings of this specification, those of ordinary skill in the art will now understand that, under appropriate circumstances, considering issues such as cost, efficiency, spatial considerations, etc., other heater configurations, such as for example, electrical heaters, induction heaters, chemical heaters, nuclear heaters, hot process heat byproduct configurations, non-boiler heaters, etc., may suffice.

Preferably, heat-transfer fluid 104 is circulated to heat-transfer element 110 via circulator 114, as shown. Preferably, circulator 114 is a pipe configuration, as shown. Preferably, circulator 114 comprises a pump 120 and a drain 122, as shown in FIG. 1. Upon reading the teachings of this specification, those of ordinary skill in the art will now understand that, under appropriate circumstances, considering issues such as cost, safety, etc., other circulator configurations, such as for example, free-falling fluid circulators, forced convection circulators, non-pipe circulators, etc., may suffice.

Typically, heat-transfer fluid providers and process heaters utilizing hydrocarbon fluids must be drained every 7 or 8 years, due primarily to degradation of the hydrocarbon fluid and buildup of undesirable particulate waste matter. Preferably, heat-transfer system 102 comprises purifier 118, as shown. Preferably, purifier 118 comprises a filter.

Preferably, purifier 118 comprises a membrane filter, such that undesirable particulates can be removed from heat-transfer fluid 104 without draining heat-transfer fluid provider 112 (at least embodying herein wherein said circulating means comprises membrane filtration means for assisting membrane filtration of said heat-transfer fluid means). In addition, such a permeable membrane allows for replenishment of heat-transfer fluid 104. Preferably, the membrane is a FILMTEC membrane manufactured by Dow Chemical Company. U.S. Pat. No. 5,167,826, to Eaton, issued Dec. 1, 1992, provides an example of a membrane purification system suitable for purifying diols, and is herein incorporated by reference in its entirety (this patent is also available in Appendix A of the provisional patent application from which this application claims priority).

Preferably, purifier 118 comprises an ion exchange purification means, such that undesirable ions can be removed from heat-transfer fluid 104 without draining heat-transfer fluid provider 112 (at least embodying herein wherein said circulating means comprises ion exchange purifier means for assisting ion exchange purification of said heat-transfer fluid means). Preferably, the ion exchange means is a DOWEX ion exchange resin manufactured by Dow Chemical Company, of Midland, Mich., USA. Any of particulate filtration, membrane filtration, ion exchange purification, and ion exchange membrane purification may be used as needed, in any required combination. Upon reading the teachings of this specification, those ordinary of skill in the art will now understand that, under appropriate circumstances, considering issues such as cost, ease of use, efficiency, etc., other purifiers, such as for example, additives, drain-filter combinations, non-membrane purifiers, etc., may suffice.

When existing oil based heat-transfer systems are switched over to water-miscible heat-transfer fluids, the two heat-transfer fluids will be immiscible. Oil contamination may lower the efficiency of the water-miscible heat-transfer fluid. Fortunately, non-hydrocarbon heat-transfer fluids are denser than oil. Therefore, oil remaining in the heat-transfer system will separate from the water-miscible heat-transfer fluid and collect in the high points of the heat-transfer system, where it may be easily removed.

Given that heat-transfer system 106 is superior to oil-based systems, it is a useful business method to use heat-transfer system 106, and/or to provide installation and upgrade services to endothermic-industrial processors, where appropriate. For example, according to this invention heat-transfer fluid 104 will circulate through circulator 108 and heat-transfer element 110 (at least embodying herein the steps of: introducing, into such circulation, heat-transfer fluids comprising no substantial fraction of hydrocarbons; and operating such heat-transfer system serving such endothermic industrial processing with such introduced heat-transfer fluids).

Figure 7:
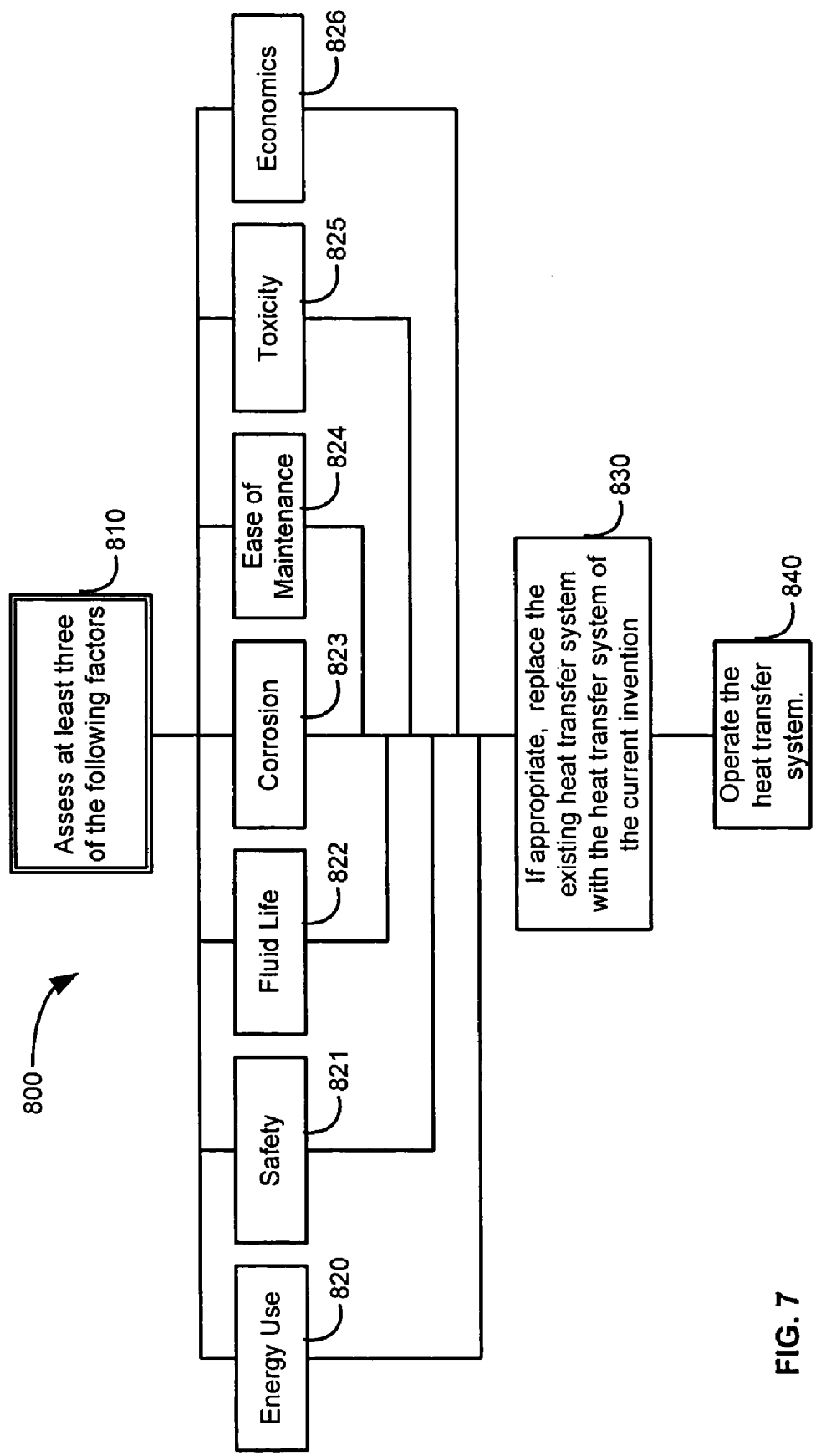
FIG. 7 shows a diagram illustrating method steps of a preferred embodiment of the present invention.

FIG. 7 is a flowchart 800 of the steps of choosing to install the heat-transfer system 106 of the present invention. First, an endothermic industrial processor operating at an appropriate temperature range is selected. Then, there is performed a situational analysis for the selected endothermic industrial processor, such as, preferably, for example, assessing 810 at least three decision-making factor sets from factor sets such as energy use 820, safety 821, fluid life 822, corrosion 823, ease of maintenance 824, toxicity 825, and economic factors 826. If the heat-transfer system of the invention is appropriate, the next step would be to replace 830 the existing heat-transfer fluid with the heat-transfer fluid of the invention and operate 840 the heat-transfer system (at least embodying herein the steps of: assessing at least three factor sets of seven factor sets of energy use factors involving such at least one heat-transfer system, safety factors involving such at least one heat-transfer system, fluid life factors involving such at least one heat-transfer system, corrosion factors involving such at least one heat-transfer system, ease of maintenance of such heat-transfer fluids, toxicity factors involving such at least one heat-transfer system, and economic factors involving such at least one heat-transfer system; and then based on such assessments, substantially replacing such long-chain hydrocarbon heat-transfer fluids with heat-transfer fluids comprising no substantial fraction of hydrocarbons; and then operating such at least one heat-transfer system serving such endothermic industrial processing with such replaced heat-transfer fluids).

Figure 8:
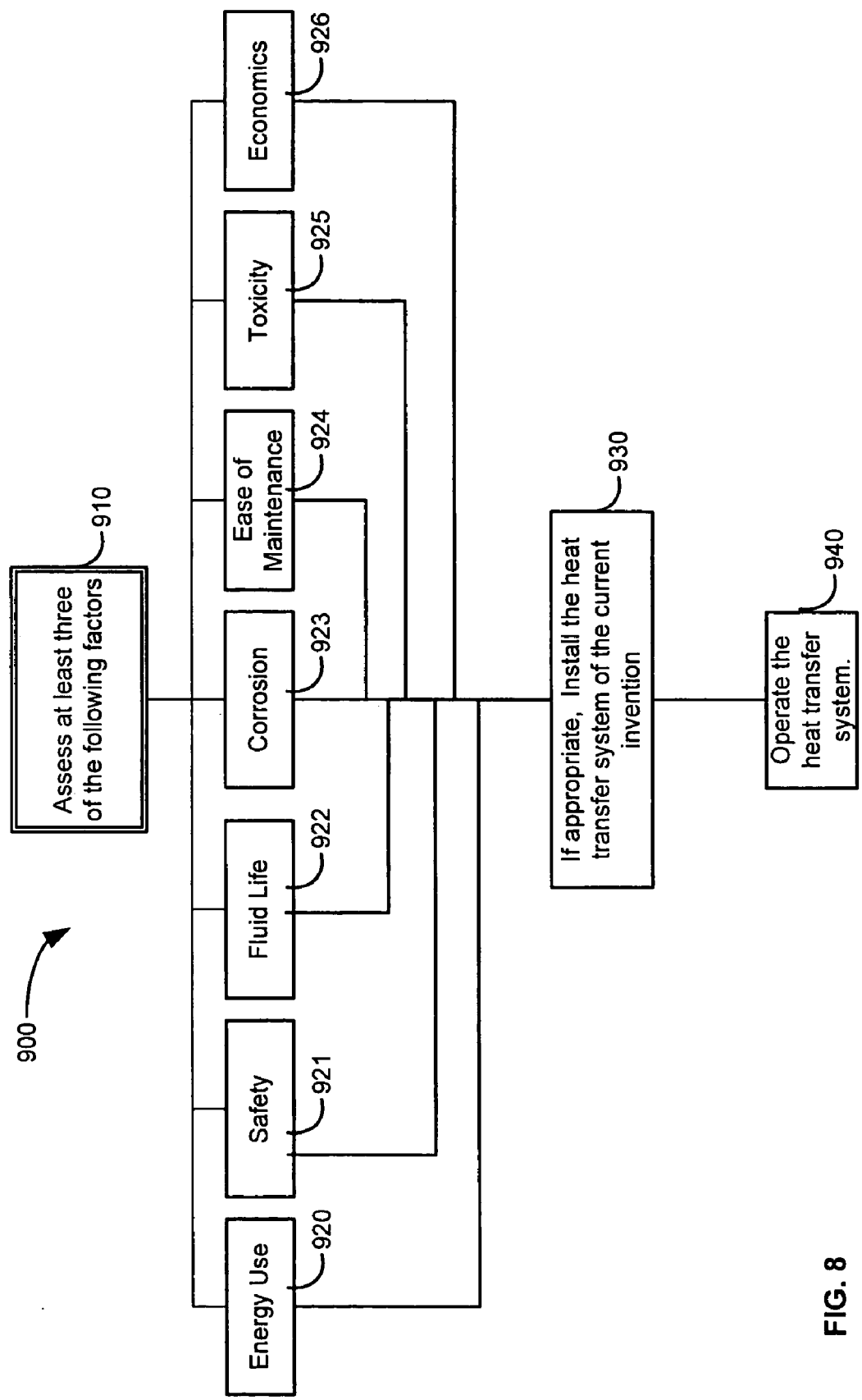
FIG. 8 shows a diagram of method steps of an alternate preferred embodiment of the present invention.

FIG. 8 is a flowchart 900 of the steps of choosing to install the heat-transfer system of the invention. First, an endothermic industrial processor designed to operate at an appropriate temperature range is selected. A user may then perform a situational analysis for the endothermic industrial processor, such as, for example, assessing 910 at least three decision-making factors (among such factor sets such as energy use 920, safety 921, fluid life 922, corrosion 923, ease of maintenance 924, toxicity 925, and economic factors 926). If the heat-transfer system of the invention is appropriate, such user may install 930 the heat-transfer system of the invention and operate 940 the heat-transfer system (at least embodying herein the steps of: assessing at least three factor sets of seven factor sets of energy use factors involving such at least one heat-transfer system, safety factors involving such at least one heat-transfer system, fluid life factors involving such at least one heat-transfer system, corrosion factors involving such at least one heat-transfer system, ease of maintenance of such heat-transfer fluids, toxicity factors involving such at least one heat-transfer system, and economic factors involving such at least one heat-transfer system; and then based substantially on such assessments, using with such heat-transfer systems chosen heat-transfer fluids comprising no substantial fraction of hydrocarbons; and then operating such at least one heat-transfer system serving such endothermic industrial processing with such chosen heat-transfer fluids).

Preferably, user will heat the heat-transfer fluid 104 to at least 150 degrees Celsius utilizing heater 116. Preferably, user will heat endothermic industrial processor 106, to a desired temperature, utilizing the heated heat-transfer fluid 104. Preferably, user purifies heat-transfer fluid 104 utilizing purifier 118.

Preferably, user will locate a circulator, drain the circulator of foreign matter, and then clean the circulator. Preferably, user will fill circulator 114 with 1,3-propanediol, and operate the circulator. Preferably, circulator comprises purifier 118, which was installed by user.

Figure 10:
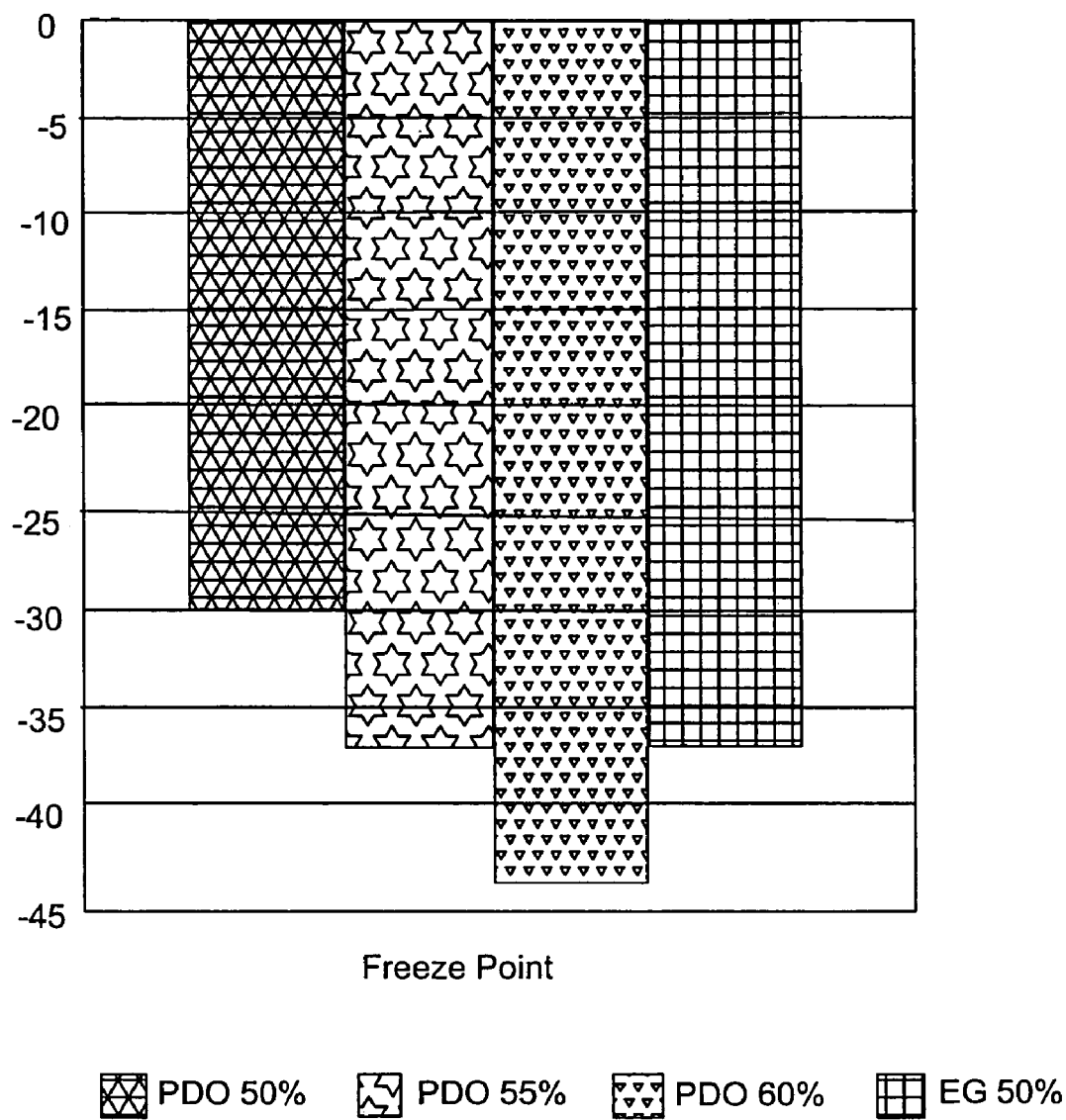
FIG. 10 shows a chart of freeze point characteristics of PDO and ethylene glycol.
Figure 11:
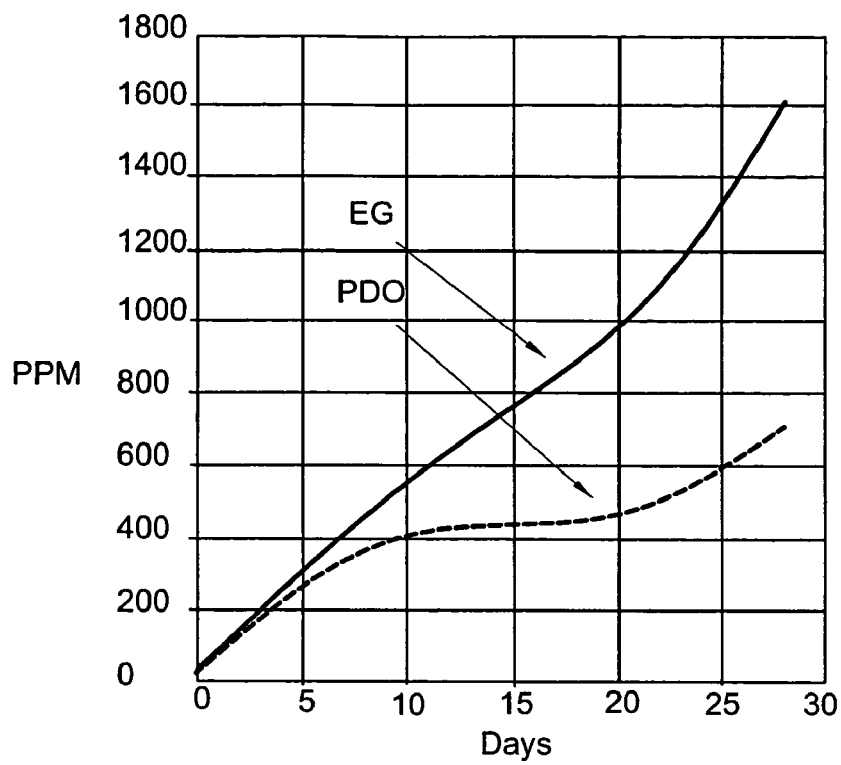
FIG. 11 shows a chart of oxidation over time for PDO and ethylene glycol.
Figure 12:
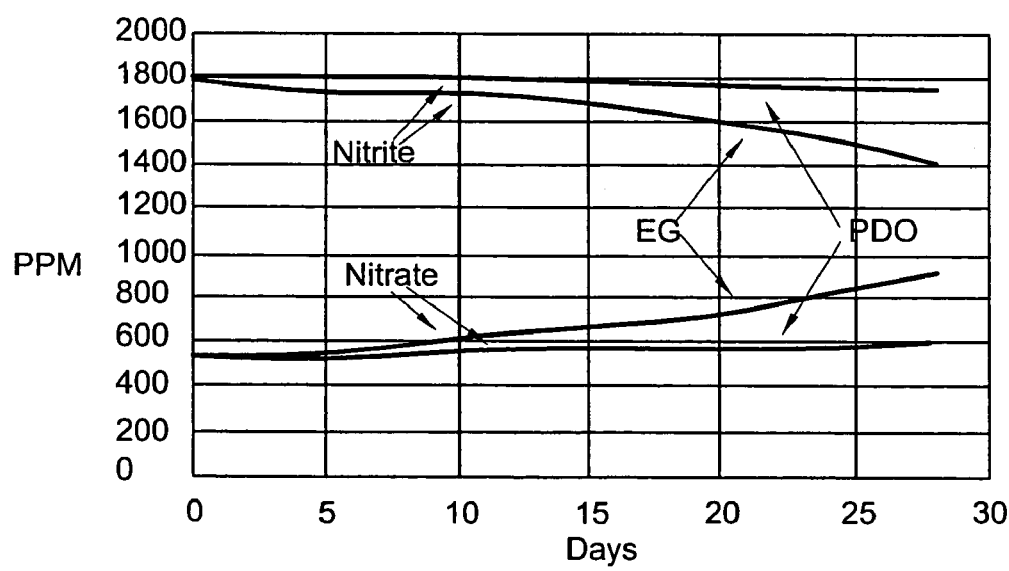
FIG. 12 shows a chart of nitrite and nitrate behavior in PDO and ethylene glycol.

With reference to FIGS. 10-12, FIG. 10 illustrates the aqueous solution freeze point characteristics of the GM 6043 PDO and GM 6043 EG. This section is taken from a research article, "A Chemical Base for Engine Coolant/Antifreeze with Improved Thermal Stability Properties" by Edward Eaton, W. H. Boon, and Chris J. Smith, herein incorporated by reference in its entirety. Table 1.1 Physical Tests is shown below. There is a slight compromise of the freeze protection as determined by the ASTM D11779 test method, but the scientist performing the test noted that the PDO was distinctly softer and more wet in the characteristically slushy phase of diols at the determined freeze point. This could be an indication that actual protection against hard, damaging freezing is actually better, approaching the effective protection point of the EG-based product. The authors (one of whom is an applicant herein) also performed the D1177 test with 55% and 60% PDO in water, and found that the 55% concentrated product offered protection equivalent to 50% EG, per the test method. Freeze protection continued to improve at 60% PDO. The authors feel that the antifreeze properties of the chemistry are acceptable; indeed a 50% solution would provide adequate protection against freezing in most geographies.

Table 1.1 shows the following: The boiling point of the 50% solution by ASTM D1120 is 106 degrees Celsius, one degree lower than the 50% EG at 107 degrees Celsius. PDO has a slightly lower specific gravity (SG) than EG when measured by the ASTM D1122 method. The EG based antifreeze was found to have a SG of 1.129 whereas the PDO SG was measured at 1.070. Neither coolant had any effect when subjected to the effect on automotive finish evaluation (ASTM D1882). Indeed, as reflected in Tables 1.1 to 1.3, 2.1 to 2.3 and 3.1 to 3.3, many of the physical properties of the two coolants are very similar. The similarity is beneficial, because the new coolant will almost certainly be contaminated from time to time with EG and/or PG based coolants. When contamination occurs, it would be desirable that no harm to the system results. Presumably, only some of the anti-oxidation benefit would be lost.

TABLE 1.1

Physical Properties: Light Duty

| Test Number & Description | | PDO 6043 | GM 6043(EG) |
|---|---|---|---|
| D1122 Specific Gravity | | 1.070 | 1.129 |
| D1177 Freeze Point 50% vol. in water | | −28 C.(−18° F.) | −38 C.(−36 F.) |
| D1120 Boiling Point 50% vol. in water | | 106 C.(222 F.) | 107 C.(226 F.) |
| D1882 Auto Finish Effect | | none | none |
| D1119 Ash Content | | 0.81% | 0.87% |
| D1287 pH: 50% vol. in DI water | | 9.8 | 8.67 |
| D3634 Chloride | | 16 | 11 |
| D1123 Water, mass | percent | 4.1% | 4.0% |
| D1121 Reserve Alkalinity | | 9.8 | 9.3 |
| D1881 Foaming Tendencies | | Break 3.6 Sec Vol. 113 ml | Break 1.6 Sec Vol. 50 ml |

TABLE 1.2

Glassware Testing Data Light Duty

| Test Number & Description | | PDO 6043 | GM 6043(EG) |
|---|---|---|---|
| D4340 Corrosion of Aluminum Heat Rejecting Surface | | 0.27 mg/cm2/week | 0.12 mg/cm2/week |
| D1384 Corrosion in Glassware | Cu | 3 mg | 3 mg |
| | Solder | 1 mg | 1 mg |
| | Brass | 2 mg | 2 mg |
| | Steel | 1 mg | 1 mg |
| | Cast Fe | 2 mg | 1 mg |
| | Cast Al | 0 mg | 0 mg |

TABLE 1.3

Simulated Service Tests Light Duty

| Test Number & Description | | PDO 6043 | GM 6043(EG) |
|---|---|---|---|
| D2570 Simulated Service | Cu | 3 mg | 5 mg |
| | Solder | 0 mg | 4 mg |
| | Brass | 7 mg | 0 mg |
| | Steel | 1 mg | 3 mg |
| | Cast Fe | 0 mg | 3 mg |
| | Cast Al | 4 mg | 1 mg |
| D2809 Water Pump Cavitation-Erosion | | 8 | 8 |

The water content of the antifreeze is contributed by the inhibition technology, so there is no difference in the two base alternatives. Similarly, pH, chloride and ash characteristics were equivalent. The foaming tendency of the PDO was slightly higher, but remained within the ASTM D3306 limits. (Tables 1.1, 1.2, 1.3) Inhibited with the GM 6043 chemistry, the PDO performed as well as EG in the modified ASTM-type tests.

The data reported to this point in the paper were developed to learn if PDO had potential as an engine coolant. The data prove that the properties of the new chemistry are favorable, and justified further research. The next stage of research targeted commercial fleet engines.

Fully Formulated (heavy duty) The second round of tests evaluated PDO as a heavy-duty or 'universal' fleet targeted coolant. This course of testing was undertaken because reports had reached the authors that EG-based coolants in heavy duty diesel trucks equipped with prototype EGR devices were turning black and corrosive in less than three months/50,000 km. To determine the viability of PDO as a heavy-duty coolant, it was prepared with both the ASTM D6210 type inhibitor chemistries.

The chemistries are generally described in paragraphs A 1.2.1 (referred to henceforth in this paper as type 'A') and A 1.2.2 (type 'B'). These chemistries, in addition to the requirements that they meet the performance specifications for cars and light trucks, are required to contain chemistry to protect heavy-duty diesel engines commonly engineered with wet sleeve liners against cavitation-erosion. The tests were run against a similarly inhibited EG control. The coolant samples were all prepared in the laboratory, using the same inhibitor provided by two major inhibitor manufacturers.

PDO appears to offer intriguing advantages. The customary data is reported in Tables 2.1 to 2.3. They reveal potential advantages in corrosion protection, in particular, protection against lead solder corrosion. The authors remind the reader that these tests were run at higher temperatures, where possible, than is specified by ASTM D6210, so these data should not necessarily be viewed as 'pass' or 'fail' per the standard, but as research experiments.

In the elevated temperature aluminum heat rejection test, based on D4340, reported in Table 2.2, the coolants were operated for 168 hours at 150 degrees Celsius. The standard method specifies 168 hours at 135 degrees Celsius. Similarly, the temperature was elevated in the D1384 and D2570 to the maximum sustainable in the equipment. The operating temperature modifications are noted in the data Tables, 2.1 to 2.3, below:

TABLE 2.1

Physical Properties:

| Test Number & Description | HD type 'A' PDO 6210 'A' | Control EG 6210 'A' |
|---|---|---|
| D1122 Specific Gravity | 1.067 | 1.127 |
| D1177 Freeze Point 50% vol. in water | −30 C.(−21 F.) | −38 C.(−36 F.) |
| D1120 Boiling Point 50% vol. in water | 107 C.(226 F.) | 107 C.(226 F.) |
| D1882 Auto Finish Effect | No effect | No effect |
| D1119 Ash Content | 0.55% | 0.80% |
| D1287 pH: 50% vol. in DI water | 11.25 | 11.0 |
| D3634 Chloride | 24 | 25 |
| D1123 Water, mass % | <3.0% | <3.0% |
| D1121 Reserve Alkalinity | 6.8 | 8.8 |
| D1881 Foaming Tendencies | Break 3.3 Sec Vol. 65 ml | Break 2.1 Sec Vol. 55 ml |

TABLE 2.2

Glassware Testing Data HD type A

| Test Number & Description | | PDO 6210 'A' | Control EG 6210 'A' |
|---|---|---|---|
| D4340 Corrosion of Aluminum Heat Rejecting Surface @ 150 C. | | 0.28 mg/cm2/week | 0.20 mg/cm2/week |
| pH Before & After Test | | 11.3 & 8.6 | 11.0 & 8.2 |
| D1384 Corrosion in Glassware @ 150° C. | Cu | 3 mg | 4 mg |
| | Solder | 2 mg | 26 mg |
| | Brass | 2 mg | 2 mg |
| | Steel | 1 mg | 1 mg |
| | Cast Fe | 0 mg | 0 mg |
| | Cast Al | 4 mg | 0 mg |

TABLE 2.3

Simulated Service Tests: HD type 'A'

| Test Number & Description | | PDO 6210 'A' | Control EG 6210 'A' |
|---|---|---|---|
| D2570 Simulated Service @ 87 OC | Cu | 12 mg | 8 mg |
| | Solder | 11 mg | 56 mg |
| | Brass | 4 mg | 1 mg |
| | Steel | 3 mg | 1 mg |
| | Cast Fe | 0 mg | 1 mg |
| | Cast Al | 0 mg | 0 mg |
| D2809 Water Pump Cavitation-Erosion | | 8 | 3 |

The data are interesting in that, in this set of tests, two annoying tendencies of type 'A' formulations are soundly dampened by the PDO. Namely, higher solder corrosion in D1384 and D2570 and the inconsistent water pump erosion performance sometimes seen in the D2809, as was reported in this sequence.

An additional test was engineered. As coolant ages in use, some of the glycols oxidize. Samples of the control type 'A' and PDO type 'A' coolants were blended at 50% and heated at 150 degrees Celsius for 28 days in an ASTM D4340 test rig (no corrosive water was added). Ethylene glycol may form formic acid, glycolic acid or oxalic acid. PDO was analyzed for these and larger C3 carboxylates in case degradation of the PDO molecule might produce them.

FIG. 11 illustrates the behavior of the coolants' degradation acids. The data suggests that high temperature characteristics of PDO may be better and that it may resist oxidation degradation better than EG.

FIG. 12 illustrates the behavior of nitrite. It is intriguing to observe that the nitrite concentration is extremely stable in the PDO while the nitrite manifests a classical and expected oxidation to nitrate in EG. There are no metals in this test; pure oxidation is the only depletion mechanism.

With type 'B' inhibitor, PDO offers equivalent to slightly better corrosion protection evidenced by modified D1384 and D2570 data. In particular, chemical analyses of the coolants were conducted to quantify and compare the degradation of coolants as evidenced by the concentration of oxidation products.

PDO type 'A' and type 'B' both produced very positive data. In the higher temperature testing, data either were equivalent to or better than the EG. Significant improvements were documented in lead solder performance, aluminum water pump erosion/corrosion and degradation of PDO. Corrosion in glassware, the ASTM D1384 method, was performed with the standard set of six metal samples. Type 'B' data for each the six metals are reported in Table 2.2. The standard test requires 336 hours of exposure at 88 degrees Celsius. This test was run for 336 hours at 150 degrees Celsius by using a propylene glycol bath instead of water. Similarly, the coolant temperature was elevated in the D4340 apparatus.

The maximum safe operating temperature of the standard simulated service rig was deemed to be 93 degrees Celsius, five degrees warmer than the normal operating temperature of 88 degrees Celsius. In general, the data from the simulated service paralleled that of the corrosion in glassware test.

Finally, the two coolants were evaluated in a hot surface scale rig. There are currently no ASTM requirements or suggestions for limits in scale formation resulting from this method. The proposed method involves introducing a fluid consisting of 8 volume percent of the sample mixed in corrosive hard water into the test apparatus. The apparatus is operated for 100 hours, exposing the sample to a hot steel surface in order to learn if the chemistry can prevent the formation of scale. The control type 'A' performed somewhat about the same as the PDO type 'A'. The EG control generated 1.6 grams of scale and the PDO generated 2.3 grams. This data suggests both coolants would require additives to prevent scale formation in service with hard water, although the type 'A' formulation technology has exhibited positive fleet experience.

The research next turned to repeating the testing using type 'B' Inhibitor. The PDO surprised the researchers by displaying unexpected reactions in the course of blending the type 'B' formulation; it gelled. Although a most intriguing event, this behavior was not useful in the evaluation of the product as an engine coolant. Experimentation finally succeeded in a method that required first blending the type 'B' inhibitors in water and then adding the PDO to successfully produce the prototype 50% pre-diluted coolant product. If marketed, this variation may only be available as a "ready-to-use" coolant. Of course, further formulation work certainly may find a way to overcome this most peculiar property.

The type 'B' chemistry differs from the type 'A' in that it includes phosphate in place of borate as a pH buffer and adds molybdate and an additional anti-cavitation inhibitor for wet-sleeve lined diesel engines. The two types of heavy-duty coolants herein evaluated are approximately equally represented in North American fleets. Type 'B' may be a bit more common in the global marketplace. Chances are that the final formulations for both variations will be optimized for PDO. Each of the two has produced interesting data; each had advantages and disadvantages over the other. In PDO, an optimized chemistry may offer an excellent performing product that offers long service intervals and superior corrosion protection. The data for the type 'B' formulation follows in Tables 3.1, 3.2 and 3.3.

The hot-scale test was also performed on the PDO type 'B'. There was no scale formed on the hot surface (0.0 mg). The test stand was inspected, and the correct operation of the rig and execution of the procedure was verified. The EG control experiment generated 0.18 g of scale.

The data from the type 'B' experiments are similar to the data from the type 'A'. There is evidence that the oxidation of the coolant is faster in EG than in PDO. This evidence is that the formates and glycolates are significantly lower in PDO than in EG-based coolant. A field refractometer and coolant test strips to measure the approximate concentration and corresponding freeze point of PDO coolants is in development. Laboratory methods to monitor the quality and performance of PDO coolants are also being refined. The authors expect such methods to include at least conventional wet chemistry, ion chromatography, liquid chromatography, atomic absorption spectrophotometry and emissions methods.

TABLE 3.1

Physical Properties: HD type 'B'

| Test Number & Description | PDO 'B' | EG 'B' |
| --- | --- | --- |
| D1122 Specific Gravity | 1.062 | 1.135 |
| D1177 Freeze Point 50% vol. in water | −30 C.(−21 F.) | −38 C.(−36 F.) |
| D1120 Boiling Point 50% vol. in water | 107 C.(226 F.) | 108 C.(228 F.) |
| D1882 Auto Finish Effect | No effect | No effect |
| D1119 Ash Content | 1.58% | 1.76% |
| D1287 pH: 50% vol. in DI water | 10.6 | 10.5 |
| D3634 Chloride | 10 | 10 |
| D1123 Water, mass % | <3.0% | <3.0% |
| D1121 Reserve Alkalinity @ 50% | 11.0 | 10.8 |
| D1881 Foaming Tendencies | Break 4.2 Sec Vol. 215 ml | Break 2.2 Sec Vol. 85 ml |

TABLE 3.2

Glassware Testing Data HD type 'B'

| Test Number & Description | | PDO 'B' | EG 'B' |
| --- | --- | --- | --- |
| D4340 Corrosion of Aluminum Heat Rejecting Surface @ 150 C. | | 0.32 mg/cm2/week | 9.0 mg/cm2/wk |

TABLE 3.2-continued

Glassware Testing Data HD type 'B'

| Test Number & Description | | PDO 'B' | EG 'B' |
| --- | --- | --- | --- |
| pH Before & After Test | | 10.6 & 10.0 | 10.5 & 10.0 |
| D1384 Corrosion in Glassware @ 150 C. | Cu | 2 mg | 1 mg |
| | Solder | 2 mg | 2 mg |
| | Brass | 1 mg | 2 mg |
| | Steel | 2 mg | 5 mg |
| | Cast Fe | 0 mg | 7 mg |
| | Cast Al | 0 mg | 0 mg |

TABLE 3.3

Simulated Service Tests: HD type B

| Test Number & Description | | PDO 'B' | EG 'B' |
| --- | --- | --- | --- |
| D2570 Simulated Service @ 87 OC | Cu | 3 mg | 1 mg |
| | Solder | 1 mg | 58 mg |
| | Brass | 8 mg | 1 mg |
| | Steel | 2 mg | 0 mg |
| | Cast Fe | 0 mg | 0 mg |
| | Cast Al | 1 mg | 8 mg |
| D2809 Water Pump Cavitation-Erosion | | 9 | 8 |

(As a conclusion of the authors) A prospective new base chemical has been discovered that resists oxidation due to thermal stress better than ethylene glycol. The chemistry, Shell Chemical's 1,3 propanediol or PDO, may be successfully inhibited with conventional light duty and fully formulated heavy-duty inhibition technologies. The coolant base has passed all of the high temperature-modified ASTM type tests, demonstrating PDO's capabilities in severe operating environments.

Continuing work to certify the chemistry to existing ASTM engine coolant performance standards is being conducted, but the coolant is expected to pass, given that it has already succeeded under more severe test conditions. Inhibitor package optimization for use in PDO may offer additional benefits in the final development of an extended service coolant technology. Another phase of research should investigate the behavior of PDO inhibited with extended service inhibitor chemistry, such as that used in the Caterpillar and Texaco extended service products based on 2-ethylhexanoic acid and sebacic acid carboxylate inhibitors. It will also include various 'hybrid' formulations such as are preferred by John Deere, Ford and Daimler-Chrysler.

Dupont provides the following Material Safety Data Sheet for 1,3-propanediol.

The MSDS format adheres to the standards and regulatory requirements of the United States and may not meet regulatory requirements in other countries.

1,3-PROPANEDIOL ALL IN SYNONYM LIST

SOR003
SOR003 Revised 7-AUG-2001

CHEMICAL PRODUCT/COMPANY IDENTIFICATION

Material Identification
CAS Number: 504-63-2
Formula: C3H8O2
Molecular Weight: 76.09
CAS Name: 1,3-Propanediol
Tradenames and Synonyms: Trimethylene Glycol, TMG, 3G, PDO, Refined PDO, Propane-1,3-Diol, 1,3-Propylene Glycol, 1,3-Dihydroxypropane, 2-(Hydroxymethyl) Ethanol
Company Identification
MANUFACTURER/DISTRIBUTOR DuPont 3GT Business Venture, Barley Mill Plaza 23
P.O. Box 80023, Wilmington, DE 19880-0023
PHONE NUMBERS Product Information: 1-800-441-7515
Transport Emergency: CHEMTREC 1-800-424-9300
Medical Emergency: 1-800-441-3637

COMPOSITION/INFORMATION ON INGREDIENTS

| Components | Material | CAS Number | % |
|---|---|---|---|
|  | 1,3-Propanediol | 504-63-2 | >99.7 |

HAZARDS IDENTIFICATION

Potential Health Effects
1,3-PROPANEDIOL
Based on animal data, skin contact with 1,3-Propanediol may cause dermatitis with itching or rash. Based on animal data, no adverse effects are expected from incidental eye contact with 1,3-Propanediol. Based on animal data, ingestion of 1,3-Propanediol may cause liver abnormalities.
Carcinogenicity Information
None of the components present in this material at concentrations equal to or greater than 0.1% are listed by IARC, NTP, OSHA or ACGIH as a carcinogen.

FIRST AID MEASURES INHALATION

If inhaled, remove to fresh air. If not breathing, give artificial respiration. If breathing is difficult, give oxygen. Call a physician.
SKIN CONTACT Flush skin with water after contact. Wash contaminated clothing before reuse.
EYE CONTACT In case of contact, immediately flush eyes with plenty of water for at least 15 minutes. Call a physician.
INGESTION If swallowed, do not induce vomiting. Immediately give 2 glasses of water. Never give anything by mouth to an unconscious person.
Call a physician.
Notes to Physicians
No antidote or specific regimens known.
Use supportive measures as needed.

FIRE FIGHTING MEASURES

Flammable Properties
Flash Point: 131 C. (268 F.) Method: Cleveland Open Cup - COC.
This material will burn. It is not an explosion hazard.
Extinguishing Media
Water, Foam, Dry Chemical, CO2, Water Spray.
Fire Fighting Instructions
Evacuate personnel to a safe area. Keep personnel removed and upwind of fire. Wear self-contained breathing apparatus. Avoid breathing vapor. Use water spray to knock down vapor.

ACCIDENTAL RELEASE MEASURES

Safeguards (Personnel)
NOTE: Review FIRE FIGHTING MEASURES and HANDLING (PERSONNEL) sections before proceeding with clean-up. Use appropriate PERSONAL PROTECTIVE EQUIPMENT during clean-up.
Initial Containment -continued Dike spill. Prevent material from entering sewers, waterways, or low areas.
Spill Clean Up
Soak up with sawdust, sand, oil dry or other absorbent material.
Accidental Release Measures
Ventilate area and wash spill site after material pickup is complete.

HANDLING AND STORAGE

Handling (Personnel)
Avoid breathing vapors or mist. Avoid contact with eyes, skin or clothing.
Wash thoroughly after handling. Avoid prolonged or repeated exposure.
Storage
Keep container tightly closed. Keep away from heat, sparks and flames.
Store in a cool, dry place.

EXPOSURE CONTROLS/PERSONAL PROTECTION

Engineering Controls
Keep container tightly closed. Mechanical exhaust required.
Keep away from heat and open flame. Store in a cool dry place.
Personal Protective Equipment
EYE/FACE PROTECTION Wear safety glasses or coverall chemical splash goggles.
RESPIRATOR Where there is potential for airborne exposure, wear appropriate NIOSH approved respiratory protection.
PROTECTIVE CLOTHING Where there is potential for skin contact have available, and wear as appropriate, impervious gloves, apron, pants, and jacket.
Exposure Guidelines
Exposure Limits
1,3-PROPANEDIOL ALL IN SYNONYM LIST SOR003
AEL* (DuPont): 5 mg/m3, 8 & 12 Hr. TWA
* AEL is DuPont's Acceptable Exposure Limit. Where governmentally imposed occupational exposure limits which are lower than the AEL are in effect, such limits shall take precedence.

PHYSICAL AND CHEMICAL PROPERTIES

Physical Data

| Boiling Point: 214 C. (417 F.) | Melting Point: −24 C. (−11 F.) |
|---|---|
| Vapor Pressure: 0.08 mm Hg @ 20 C. (68 F.) | 9.8 mm Hg @ 100 C. (212 F.) |
| Solubility in Water: Miscible with water | |
| pH: 4.5-7 in water. Color: Colorless. | Form: Liquid. |
| Specific Gravity: 1.053 | Evaporation Rate: <1 (Butyl Acetate = 1.0) |

STABILITY AND REACTIVITY

Chemical Stability: Stable at normal temperatures and storage conditions.
Incompatibility with Other Materials: None reasonably foreseeable.
Decomposition: Decomposition is not known. Hazardous gases/vapors produced are methanol and acrolein in the vapor.
Polymerization: Polymerization may occur under extreme conditions between minor components but has not been experienced.

TOXICOLOGICAL INFORMATION

Animal Data 1,3-Propanediol
Oral LD50: 15,000 mg/kg in rats Dermal LD50: >20,000 mg/kg in rabbits
Inhalation 4 hour ALC: >5.0 mg/L in rats 1,3-Propanediol is not an eye irritant, is a slight skin irritant, and is not a skin sensitizer.

Repeated exposure of rats by oral gavage caused no toxicologically important changes in clinical pathology, pathology (including sperm analyses), or in-life measurements. The NOEL for this study was 1000 mg/kg/day, the highest dose tested. These results suggest that changes to testicular DNA and liver substructure observed in earlier studies are unlikely to cause adverse effects. Repeated inhalation exposure in rats caused no toxicologically important changes in clinical pathology, pathology, or in-life measurements. The NOEL was 1800 mg/m3. Animal data show that 1,3-Propanediol is not uniquely toxic to the fetus. Information about reproductive toxicity potential is limited to information from the oral repeated dose study in rats where no adverse effects to sperm and reproductive organs were observed. 1,3-Propanediol is not likely to be a genetic toxin. In vitro, it was not mutagenic in bacterial or mammalian cells. An increase in chromosome aberrations was observed in mammalian cells under certain conditions, but a repeat study with 1,3-propanediol manufactured by DuPont was negative for all test conditions. 1,3-Propanediol was also negative in the in vivo mouse micronucleus assay. No animal data are available to define the carcinogenic potential of 1,3-Propanediol.

ECOLOGICAL INFORMATION

Ecotoxicological Information 1,3-Propanediol
AQUATIC TOXICITY:

48 hour EC50 - Daphnia magna:, 7417 mg/L
72 hour NOEC - algae:, 500 mg/L

DISPOSAL CONSIDERATIONS

Waste Disposal
Treatment, storage, transportation, and disposal must be in accordance with applicable Federal, State/Provincial, and Local regulations.

TRANSPORTATION INFORMATION

Shipping Information: Not Regulated as a hazardous material by DOT, IMO, or IATA.

REGULATORY INFORMATION

U.S. Federal Regulations   TSCA Inventory Status: Listed.
TITLE III HAZARD CLASSIFICATIONS SECTIONS 311, 312

Acute: Yes   Chronic: No   Fire: No   Reactivity: No   Pressure: No
HAZARDOUS CHEMICAL LISTS SARA Extremely Hazardous Substance: No
CERCLA Hazardous Substance: No SARA Toxic Chemical: No

OTHER INFORMATION

NFPA, NPCA-HMIS
NFPA Rating
Health: 1   Flammability: 1   Reactivity: 0
NPCA-HMIS Rating
Health: 1   Flammability: 1   Reactivity: 0

Figure 13:
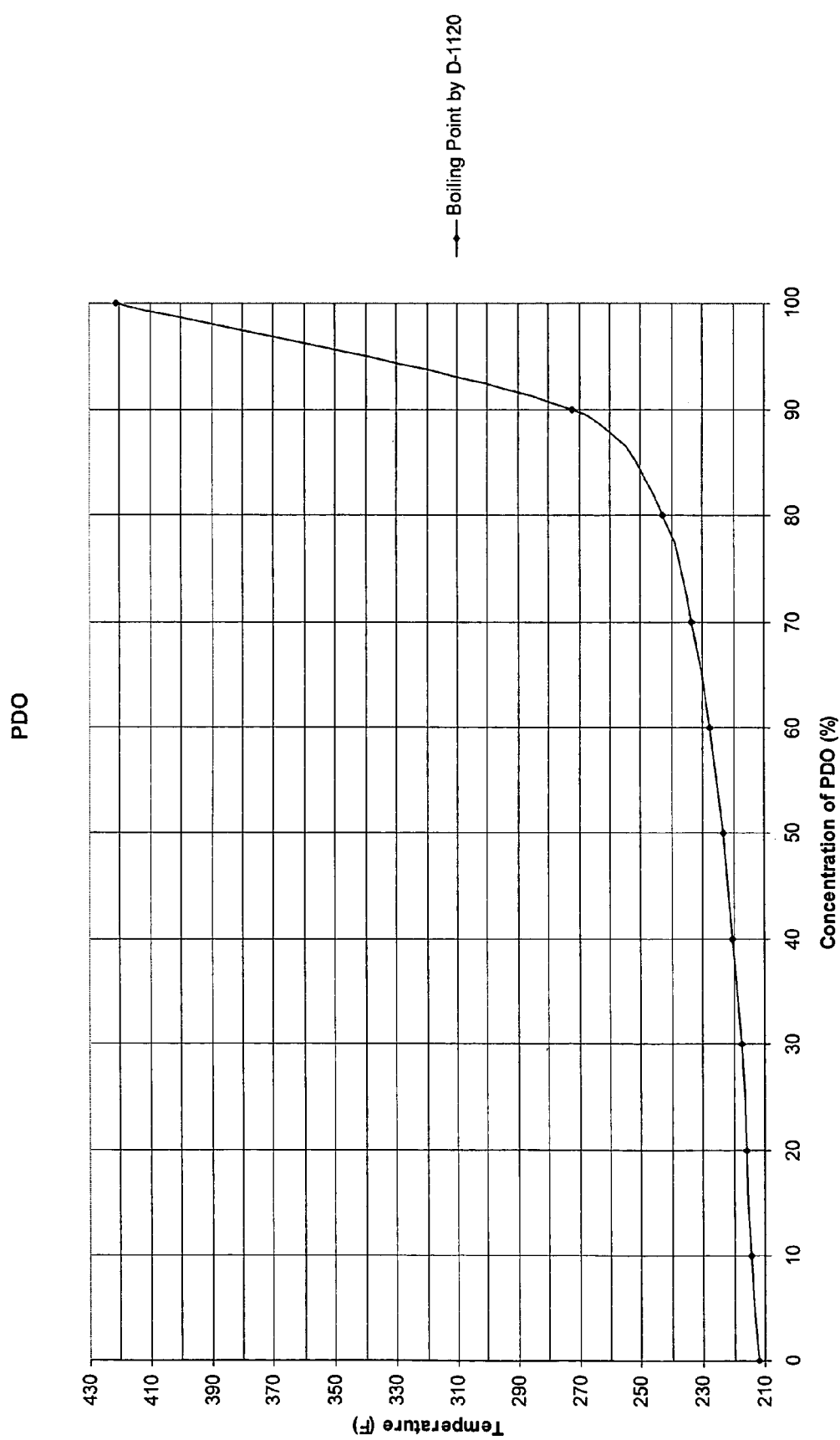
FIG. 13 shows a chart of boiling points of various concentrations of PDO in water.

FIG. 13 shows the boiling points of PDO at various concentrations in water according to ASTM D-1120 testing methods.

It is noted that various fluids including PDO have different heat capacities than oil. This may permit (if and when desired for specific applications) the use of different heat-transfer fluid temperatures in PDO or similar heat-transfer systems; or it may permit a different volume or flow rate of PDO or similar heat-transfer systems to be used to achieve the same process temperature as oil. Upon reading this specification, those with ordinary skill in this art will now understand that, under appropriate circumstances, considering such issues as flow rates, chemistry requirements, economy, equipment, advancing technology and discoveries, etc., heat capacity and other thermodynamic properties of the heat exchange fluids of this invention, such as, for example, viscosity, entropy, specific heat capacity, etc., may determine at the time and for the application the preferred process/materials parameters.

Figure 14:
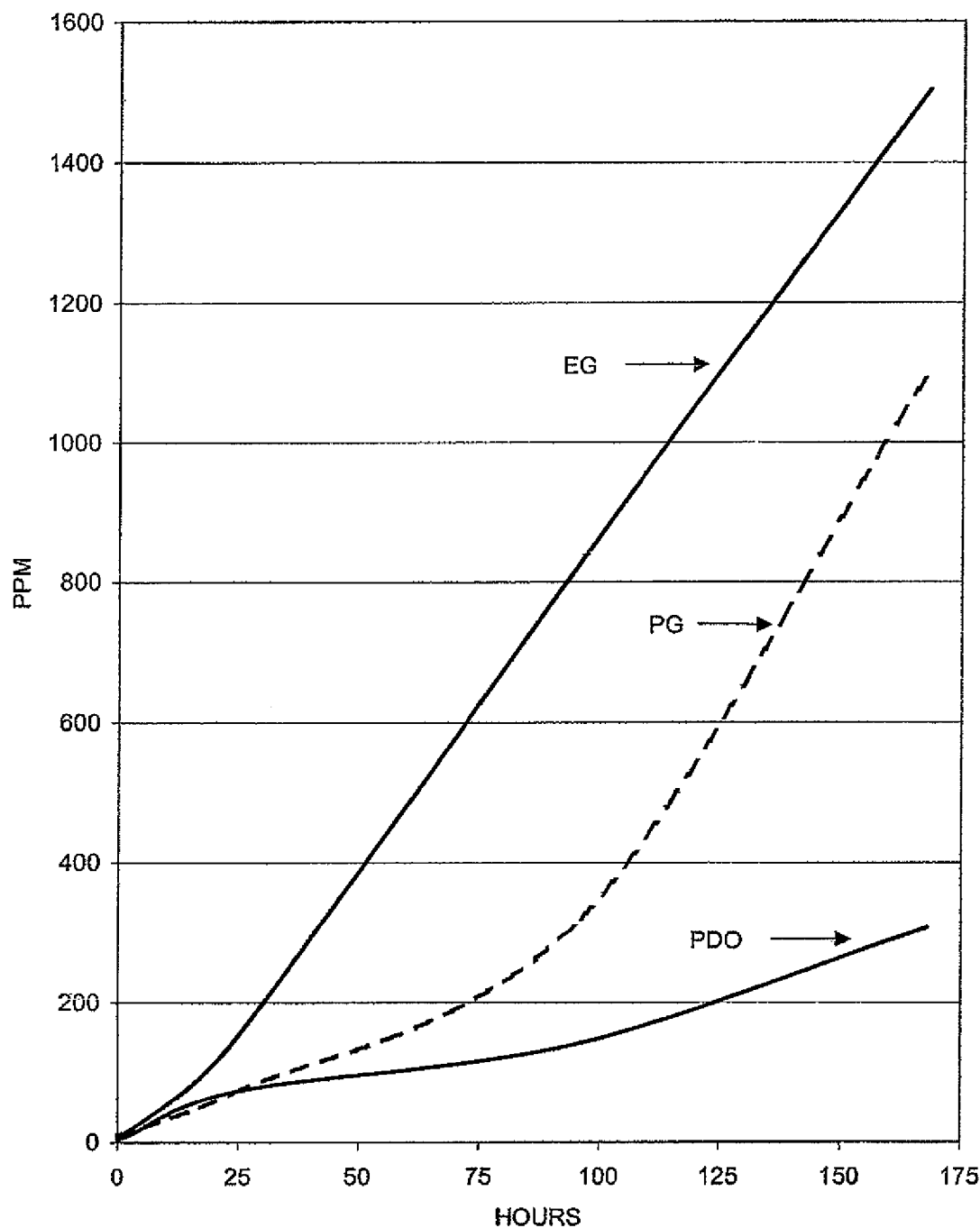
FIG. 14 shows that a solution of PDO has greater resistance to thermal degradation than ethylene glycol and propylene glycol when subjected to the same conditions.

FIG. 14 shows that a solution of PDO has greater resistance to thermal degradation than ethylene glycol and propylene glycol when subjected to the same conditions.

Data was generated to show the resistance to oxidation under thermal stress of a heat transfer fluid of the present invention by performing an ASTM D1384 test method, titled Standard Test Method for Corrosion Test in Glassware. The solutions tested include PDO solutions with commonly used corrosion inhibitors as listed in Table 4. Results of this test method are shown in Table 4. The results show that each PDO solution is within the limits of published ASTM D3306 Standard Specifications for evaluating surface metal corrosion.

TABLE 4

ASTM D1384 Results for PDO Solutions

| Coupon | Pure PDO | PDO w/ 1000 mg/l NaNo$_3$ | PDO w/ 500 mg/l NaNo$_3$ | PDO w/ 500 mg/l NaNo$_3$ & 5000 mg/l Na$_2$B$_4$O$_7$ x10H$_2$O | PDO w/ 1000 mg/l NaNo$_3$ & 10000 mg/l Na$_2$B$_4$O$_7$ x10H$_2$O |
|---|---|---|---|---|---|
| Copper | 2 | 2 | 2 | 2 | 3 |
| Solder | 15 | 10 | 8 | 9 | 17 |
| Brass | 1 | 1 | 0 | 0 | 0 |
| Steel | 0 | 0 | 0 | 0 | 0 |
| Iron | 2 | 1 | 0 | 0 | 0 |
| Aluminum | −4 | −5 | −5 | −4 | −4 |

The Table 4 corrosion data, in combination with the data of FIG. 14, evidence that the claimed heat transfer system comprising PDO. provides for a heat-transfer fluid that exhibits resistance to oxidation under thermal stress, and is thus, substantially resistant to thermal degradation, particularly at temperatures of about 100° C. to about 225° C.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claims.

What is claimed is:

1. A heat-transfer process comprising the steps of:
   (a) selecting at least one endothermic industrial process, wherein long chain hydrocarbon heat-transfer fluids circulate among heater means for heating such heat-transfer fluids and heat transfer means for transferring heat to such endothermic industrial process, wherein such heat-transfer fluids circulate at temperatures of about 150° C. to about 225° C.;
   (b) substantially removing such long-chain hydrocarbon heat transfer fluids from such circulation;
   (c) introducing, into such circulation, heat-transfer fluids comprising 1,3-propanediol; and
   (d) operating such heat transfer process serving such endothermic industrial process with such introduced heat-transfer fluids.

2. The heat-transfer process, according to claim 1, wherein such introduced heat-transfer fluids, further comprise at least one water-miscible fluid adapted to permit essentially full solubility in water of such heat-transfer fluids.

3. The heat-transfer process, according to claim 1, wherein such introduced heat-transfer fluids have a thermal conductivity of at least 0.09 Btu/hr-ft-F.

4. The heat-transfer process, according to claim 1, further comprising the step of assisting ion exchange purification of such introduced heat-transfer fluids.

5. The heat-transfer process, according to claim 1, further comprising the step of assisting membrane filtration of such introduced heat-transfer fluids.

6. The heat-transfer process, according to claim 1, wherein such step of selecting comprises the step of selecting at least one endothermic industrial process, wherein long-chain hydrocarbon heat-transfer fluids circulate among heater means for heating such heat-transfer fluids and heat transfer means for transferring heat to such endothermic industrial process, wherein such heat-transfer fluids circulate at temperatures of about 150° C. to about 215° C.

7. The heat transfer process, according to claim 6, wherein such step of selecting comprises the step of selecting at least one endothermic industrial process, wherein long-chain hydrocarbon heat-transfer fluids circulate among heater means for heating such heat-transfer fluids and heat transfer means for transferring heat to such endothermic industrial process, wherein such heat-transfer fluids circulates at temperatures of about 150° C. to about 200° C.

8. A heat-transfer process comprising the steps of:
  (a) selecting at least one endothermic industrial process whose typical design circulates long-chain hydrocarbon heat-transfer fluids among heater means for heating such heat-transfer fluids and heat transfer means for transferring heat to such endothermic industrial process, wherein such heat-transfer fluids circulate at temperatures of about 150° C. to about 225° C.;
  (b) introducing, into such circulation, heat-transfer fluids comprising 1,3-propanediol; and
  (c) operating such heat transfer process serving such endothermic industrial processing with such introduced heat-transfer fluids.

9. The heat-transfer process, according to claim 8, wherein such introduced heat-transfer fluids have a thermal conductivity of at least 0.09 Btu/hr-ft-F.

10. The heat-transfer process, according to claim 8, further comprising the step of assisting ion exchange purification of such introduced heat-transfer fluids.

11. The heat-transfer process, according to claim 8, further comprising the step of assisting membrane filtration of such introduced heat-transfer fluids.

12. The heat-transfer process, according to claim 8, wherein such step of selecting comprises the step of selecting at least one endothermic industrial process whose typical design circulates long-chain hydrocarbon heat-transfer fluids among heater means for heating such heat-transfer fluids and heat transfer means for transferring heat to such endothermic industrial process, wherein such heat-transfer fluids circulate at temperatures of about 150° C. to about 215° C.

13. The heat-transfer process, according to claim 12, wherein such step of selecting comprises the step of selecting at least one endothermic industrial process whose typical design circulates long-chain hydrocarbon heat-transfer fluids among heater means for heating such heat-transfer fluids and heat transfer means for transferring heat to such endothermic industrial process, wherein such heat-transfer fluids circulate at temperatures of about 150° C. to about 200° C.

* * * * *